United States Patent
Ang et al.

(10) Patent No.: US 10,887,800 B2
(45) Date of Patent: Jan. 5, 2021

(54) SECONDARY CELL ACTIVATION AND DEACTIVATION ENHANCEMENTS IN NEW RADIO

(71) Applicant: QUALCOMM INCORPORATED, San Diego, CA (US)

(72) Inventors: Peter Pui Lok Ang, San Diego, CA (US); Peter Gaal, San Diego, CA (US); Tao Luo, San Diego, CA (US); Juan Montojo, San Diego, CA (US); Wanshi Chen, San Diego, CA (US); Heechoon Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/805,648

(22) Filed: Feb. 28, 2020

(65) Prior Publication Data
US 2020/0205041 A1    Jun. 25, 2020

Related U.S. Application Data

(63) Continuation of application No. 16/168,332, filed on Oct. 23, 2018.
(Continued)

(51) Int. Cl.
*H04L 12/28* (2006.01)
*H04W 36/00* (2009.01)
(Continued)

(52) U.S. Cl.
CPC ..... *H04W 36/0016* (2013.01); *H04J 11/0076* (2013.01); *H04L 5/001* (2013.01); *H04L 5/0035* (2013.01); *H04L 5/0053* (2013.01); *H04L 5/0092* (2013.01); *H04L 5/0098* (2013.01); *H04W 24/02* (2013.01); *H04W 36/06* (2013.01); *H04W 72/042* (2013.01);
(Continued)

(58) Field of Classification Search
CPC .... H04L 5/0035; H04L 5/0098; H04W 72/04; H04W 36/06
USPC .................. 370/252, 329, 430, 386
See application file for complete search history.

(56) References Cited

U.S. PATENT DOCUMENTS

2011/0243106 A1* 10/2011 Hsu ................. H04W 72/1284
                                                                    370/336
2015/0078261 A1   3/2015 Yu et al.
(Continued)

OTHER PUBLICATIONS

Internationalsearch Report and Written Opinion—PCT/US2018/057377—ISA/EPO—dated Feb. 11, 2019.
(Continued)

*Primary Examiner* — John Pezzlo
(74) *Attorney, Agent, or Firm* — Linda G. Gunderson; Holland & Hart LLP

(57) ABSTRACT

Methods, systems, and devices for wireless communications are described. One method may include transmitting a first signal instructing a user equipment (UE) to transition a state of a secondary cell associated with the UE; determining an allocation of resources for the UE to communicate with the secondary cell; and transmitting a second signal including an indication of an active bandwidth part (BWP) used for the allocation of resources based on the determining. The active BWP and the first signal may indicate the transition of the state of the secondary cell.

30 Claims, 18 Drawing Sheets

Related U.S. Application Data

(60) Provisional application No. 62/587,311, filed on Nov. 16, 2017, provisional application No. 62/577,077, filed on Oct. 25, 2017.

(51) Int. Cl.

| | | |
|---|---|---|
| *H04W 36/06* | (2009.01) | |
| *H04W 76/38* | (2018.01) | |
| *H04J 11/00* | (2006.01) | |
| *H04W 72/04* | (2009.01) | |
| *H04L 5/00* | (2006.01) | |
| *H04W 72/12* | (2009.01) | |
| *H04W 24/02* | (2009.01) | |
| *H04J 1/16* | (2006.01) | |
| *H04W 76/27* | (2018.01) | |
| *H04B 7/024* | (2017.01) | |

(52) U.S. Cl.
CPC ....... *H04W 72/1289* (2013.01); *H04W 76/38* (2018.02); *H04B 7/024* (2013.01); *H04L 5/0037* (2013.01); *H04L 5/0091* (2013.01); *H04W 72/0453* (2013.01); *H04W 76/27* (2018.02)

(56) References Cited

U.S. PATENT DOCUMENTS

| | | | |
|---|---|---|---|
| 2016/0337177 A1 | 11/2016 | Lindoff et al. | |
| 2017/0041880 A1 | 2/2017 | Ouchi et al. | |
| 2018/0183551 A1* | 6/2018 | Chou ................. | H04L 5/001 |
| 2018/0279229 A1* | 9/2018 | Dinan ................ | H04W 52/146 |
| 2019/0021052 A1 | 1/2019 | Kadiri et al. | |
| 2019/0044689 A1 | 2/2019 | Yiu et al. | |
| 2019/0045491 A1 | 2/2019 | Zhang et al. | |
| 2019/0090299 A1* | 3/2019 | Ang .................. | H04L 5/003 |
| 2019/0098655 A1 | 3/2019 | Shih et al. | |
| 2019/0103953 A1 | 4/2019 | Liao et al. | |
| 2019/0124558 A1 | 4/2019 | Ang et al. | |
| 2019/0166631 A1* | 5/2019 | Park ................. | H04L 5/0098 |
| 2019/0199503 A1* | 6/2019 | Son .................. | H04L 5/0094 |
| 2019/0260530 A1 | 8/2019 | Yi et al. | |
| 2020/0120643 A1 | 4/2020 | Shen et al. | |
| 2020/0221526 A1* | 7/2020 | Jin ................... | H04W 76/27 |

OTHER PUBLICATIONS

Mediatekinc: "Remaining Details on Bandwidth Part Operation in NR," 3GPP Draft ;R1-1718327_Remaining Details on Bandwidth Part Operation in NR, 3rdGeneration Partnership Project (3GPP), Mobile Competence Centre; 650, RouteDes Lucioles; F-06921 Sophia-Antipolis Ced, vol. RAN WG1, No. Prague, CZ;Oct. 9, 2017-Oct. 13, 2017, Oct. 8, 2017, XP051341510, 13 pages, Retrieved fromthe Internet: URL: http://www.3gpp.org/ftp/Meetings_3GPP_SYNC/RAN1/Docs/[retrieved on Oct. 8, 2017].

Nokia,et al., "On Remaining Aspects of BWPs," 3GPP Draft; R1-1718607 on RemainingAspects of BWPs, 3rd Generation Partnership Project (3GPP), Mobile CompetenceCentre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051341781, 6pages, Retrieved from the Internet: URL: http://www.3gpp.org/ftp/tsg_ran/WG1_RL1/TSGR1_90b/Docs/ [retrieved onOct. 8, 2017], Section 2.4.

Qualcommincorporated: "Open Issues on CA," 3GPP Draft; R1-1718581 Open Issues on CA,3rd Generation Partnership Project (3GPP), Mobile Competence Centre; 650,Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051341761, 10pages, Retrieved from the Internet: URL: http://www.3gpp.org/ftp/Meetings_3GPP_SYNC/RAN1/Docs/ [retrieved onOct. 8, 2017].

Qualcomm Incorporated: "Open Issues on BWP", 3GPP DRAFT; R1-1718580 Open Issues on BWP, 3rd Generation Partnership-Project (3GPP), Mobile Competence Centre; 650 Route Des Lucioles; F-06921 Sophia-Antipolis Cedex; France, vol. RAN WG1, No. Prague, Czech Republic; Oct. 9, 2017-Oct. 13, 2017 Oct. 8, 2017, XP051341760, Retrieved from the Internet: URL:http://www.3gpp.org/ftp/Meetings_3GPP_SYNC/RAN1/Docs/ [retrieved on Oct. 8, 2017], 8 pages.

Samsung: "Activation/deactivation of Bandwidth Parts in NR," 3GPP Draft; R2-1711189,Activation_Deactivation of Bandwidth Part in NR_R2, 3rd GenerationPartnership Project (3GPP), Mobile Competence Centre; 650, Route DesLucioles; F-06921, Sophia-Antipolis CEDE, vol. RAN WG2, No. Prague, Czech;Oct. 9, 2017-Oct. 13, 2017, Sep. 29, 2017, XP051355440, 5 pages, Retrieved fromthe Internet: URL: http://www.3gpp.org/ftp/tsg_ran/WG2_RL2/TSGR2_99bis/Docs/[retrieved on Sep. 29, 2017.

* cited by examiner

SECONDARY CELL ACTIVATION AND DEACTIVATION ENHANCEMENTS IN NEW RADIO

CROSS REFERENCES

The present application for patent is a Continuation of U.S. patent application Ser. No. 16/168,332 by ANG et al., entitled "SECONDARY CELL ACTIVATION AND DEACTIVATION ENHANCEMENTS IN NEW RADIO" filed Oct. 23, 2018, which claims the benefit of U.S. Provisional Patent Application No. 62/577,077 by ANG, et al., entitled "SECONDARY CELL ACTIVATION AND DEACTIVATION ENHANCEMENTS IN NEW RADIO," filed Oct. 25, 2017, and to U.S. Provisional Patent Application No. 62/587,311 by ANG, et al., entitled "SECONDARY CELL ACTIVATION AND DEACTIVATION ENHANCEMENTS IN NEW RADIO", filed Nov. 16, 2017, assigned to the assignee hereof, and expressly incorporated by reference herein.

BACKGROUND

The following relates generally to wireless communication, and more specifically to secondary cell activation and deactivation enhancements in new radio.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as new radio systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

A UE may be configured for dual-connectivity and carrier aggregation, where the UE may receive data transmitted by two network nodes or transmit data to two different network nodes. One network node may be a primary cell next generation NodeB (gNB), and the other network node may be a secondary cell, such as a secondary next generation NodeB (SgNB). When operating in dual-connectivity and carrier aggregation mode, a UE may have increased data transmission capabilities, but may also have increased power consumption.

SUMMARY

The described techniques relate to improved methods, systems, devices, or apparatuses that support secondary cell activation and deactivation enhancements in new radio. A base station may instruct a user equipment (UE) to activate or deactivate a secondary cell based on a modification in data throughput requirements for the UE. In some examples, a secondary cell activation may be signaled to the UE using a medium access control (MAC) control element (CE). For example, a bit field in the MAC CE may indicate an activation or deactivation status of the secondary cell. Using MAC CE to indicate secondary cell activation or deactivation in next generation fifth generation (5G) or millimeter wave (mmW) new radio systems may introduce latency that may affect the UE. For example, by having the secondary cell remain activated for extended periods when activation is unnecessary, power consumption for the UE may be increased due to physical downlink control channel (PDCCH) monitoring on the activated secondary cell. In some examples, to reduce latency signaling associated with secondary cell activation and deactivation, the base station may configure a downlink control information (DCI) format that may include a bitmap for secondary cell activation and deactivation. In further examples, the base station may support a combined approach of MAC CE signaling and bandwidth part (BWP) DCI for secondary cell activation and deactivation.

A method for wireless communication is described. The method may include transmitting a first signal instructing a UE to transition a state of a secondary cell associated with the UE; determining an allocation of resources for the UE to communicate with the secondary cell; and transmitting a second signal comprising an indication of an active BWP used for the allocation of resources based at least in part on the determining, the active BWP and the first signal indicating the transition of the state of the secondary cell.

An apparatus for wireless communication is described. The apparatus may include means for transmitting a first signal instructing a UE to transition a state of a secondary cell associated with the UE; means for determining an allocation of resources for the UE to communicate with the secondary cell; and means for transmitting a second signal comprising an indication of an active BWP used for the allocation of resources based at least in part on the determining, the active BWP and the first signal indicating the transition of the state of the secondary cell.

Another apparatus for wireless communication is described. The apparatus may include a processor, memory in electronic communication with the processor, and instructions stored in the memory. The instructions may be operable to cause the processor to transmit a first signal instructing a UE to transition a state of a secondary cell associated with the UE; determine an allocation of resources for the UE to communicate with the secondary cell; and transmit a second signal comprising an indication of an active BWP used for the allocation of resources based at least in part on the determining, the active BWP and the first signal indicating the transition of the state of the secondary cell.

A non-transitory computer-readable medium for wireless communication is described. The non-transitory computer-readable medium may include instructions operable to cause a processor to transmit a first signal instructing a UE to transition a state of a secondary cell associated with the UE; determine an allocation of resources for the UE to communicate with the secondary cell; and transmit a second signal comprising an indication of an active BWP used for the allocation of resources based at least in part on the determining, the active BWP and the first signal indicating the transition of the state of the secondary cell.

In some examples of the method, apparatus, and non-transitory computer-readable medium described above, the first signal comprises a MAC CE and the second signal comprises BWP DCI. Some examples of the method, apparatus, and non-transitory computer-readable medium described above may further include processes, features, means, or instructions for transmitting, to the UE, a BWP switching DCI on the secondary cell indicating switching to a zero BWP for the secondary cell, wherein the BWP switching DCI is transmitted without a grant. Some examples of the method, apparatus, and non-transitory computer-readable medium described above may further include processes, features, means, or instructions for transmitting, to the UE, a BWP switching DCI on the primary cell indicating switching to a zero BWP for the secondary cell, wherein the BWP switching DCI comprises at least a carrier indicator field (CIF). In some examples of the method, apparatus, and non-transitory computer-readable medium described above, the BWP DCI carries BWP activation control information for the secondary cell associated with the UE.

Some examples of the method, apparatus, and non-transitory computer-readable medium described above may further include processes, features, means, or instructions for configuring the secondary cell to be in a full activated state based at least in part on the transmitted first signal and the active BWP being a non-zero BWP. Some examples of the method, apparatus, and non-transitory computer-readable medium described above may further include processes, features, means, or instructions for configuring the secondary cell to be in a partially activated state based at least in part on the transmitted first signal and the active BWP being a zero BWP.

Some examples of the method, apparatus, and non-transitory computer-readable medium described above may further include processes, features, means, or instructions for configuring one or more secondary cells to switch from the partially activated state to a full activated state based at least in part on a BWP switching DCI transmitted on a primary cell without a grant, wherein the BWP switching DCI comprises BWP activation control information for the one or more secondary cells associated with the UE. Some examples of the method, apparatus, and non-transitory computer-readable medium described above may further include processes, features, means, or instructions for configuring the secondary cell to switch from the partially activated state to a full activated state based at least in part on a BWP switching DCI transmitted on a primary cell, wherein the BWP switching DCI comprises at least a CIF.

Some examples of the method, apparatus, and non-transitory computer-readable medium described above may further include processes, features, means, or instructions for configuring the secondary cell to be in a full deactivated state based at least in part on the transmitted first signal. In some examples of the method, apparatus, and non-transitory computer-readable medium described above, the active BWP is deactivated based at least in part on the secondary cell being in a full deactivated state. Some examples of the method, apparatus, and non-transitory computer-readable medium described above may further include processes, features, means, or instructions for configuring the secondary cell to be in a full deactivated state based at least in part on a deactivation timer expiring. Some examples of the method, apparatus, and non-transitory computer-readable medium described above may further include processes, features, means, or instructions for configuring the secondary cell to switch to a default BWP comprising a zero-BWP based at least in part on a BWP timer expiring. In some examples of the method, apparatus, and non-transitory computer-readable medium described above, the state comprises a fully activated state, a partially activated state, or a fully deactivated state.

Another method for wireless communication is described. The method may include configuring at least one bit of a field in a BWP DCI to indicate selections for activated or deactivated states for a secondary cell and a BWP selection for the base station; and transmitting the BWP DCI to a UE based at least in part on the configuring.

Another apparatus for wireless communication is described. The apparatus may include means for configuring at least one bit of a field in a BWP DCI to indicate selections for activated or deactivated states for a secondary cell and a BWP selection for the base station; and means for transmitting the BWP DCI to a UE based at least in part on the configuring.

Another apparatus for wireless communication is described. The apparatus may include a processor, memory in electronic communication with the processor, and instructions stored in the memory. The instructions may be operable to cause the processor to configure at least one bit of a field in a BWP DCI to indicate selections for activated or deactivated states for a secondary cell and a BWP selection for the base station; and transmit the BWP DCI to a UE based at least in part on the configuring.

Another non-transitory computer-readable medium for wireless communication is described. The non-transitory computer-readable medium may include instructions operable to cause a processor to configure at least one bit of a field in a BWP DCI to indicate selections for activated or deactivated states for a secondary cell and a BWP selection for the base station; and transmit the BWP DCI to a UE based at least in part on the configuring.

Some examples of the method, apparatus, and non-transitory computer-readable medium described above may further include processes, features, means, or instructions for configuring a primary cell associated with the base station to switch to a default BWP based at least in part on an expiration of a timer. In some examples of the method, apparatus, and non-transitory computer-readable medium described above, the default BWP is configured to be a non-zero BWP.

Some examples of the method, apparatus, and non-transitory computer-readable medium described above may further include processes, features, means, or instructions for configuring a subset of or all secondary cells of the group to switch from a fully activated state to a partially activated state based at least in part on an expiration of a timer. In some examples of the method, apparatus, and non-transitory computer-readable medium described above, the partially activated state is associated with a default BWP comprising a zero-BWP.

Some examples of the method, apparatus, and non-transitory computer-readable medium described above may further include processes, features, means, or instructions for configuring a MAC CE to indicate the group of secondary cells based at least in part on the BWP DCI. In some examples of the method, apparatus, and non-transitory computer-readable medium described above, the BWP DCI of a primary cell associated with the base station carries BWP activation control information for the secondary cell.

Another method for wireless communication is described. The method may include configuring a bitmap in a BWP DCI, the bitmap indicating a state associated with each secondary cell of a group of secondary cells; and transmitting the BWP DCI to a UE.

Another apparatus for wireless communication is described. The apparatus may include means for configuring a bitmap in a BWP DCI, the bitmap indicating a state associated with each secondary cell of a group of secondary cells; and means for transmitting the BWP DCI to a UE.

Another apparatus for wireless communication is described. The apparatus may include a processor, memory in electronic communication with the processor, and instructions stored in the memory. The instructions may be operable to cause the processor to configure a bitmap in a BWP DCI, the bitmap indicating a state associated with each secondary cell of a group of secondary cells; and transmit the BWP DCI to a UE.

Another non-transitory computer-readable medium for wireless communication is described. The non-transitory computer-readable medium may include instructions operable to cause a processor to configure a bitmap in a BWP DCI, the bitmap indicating a state associated with each secondary cell of a group of secondary cells; and transmit the BWP DCI to a UE.

Some examples of the method, apparatus, and non-transitory computer-readable medium described above may further include processes, features, means, or instructions for identifying a number of bits associated with the bitmap; configuring at least one bit of the bitmap to indicate a target BWP ID based at least in part on the number of bits; and configuring at least a remaining number of bits for control information indicating the state associated with each secondary cell of the group of secondary cells.

Some examples of the method, apparatus, and non-transitory computer-readable medium described above may further include processes, features, means, or instructions for transmitting the state associated with each secondary cell of the group of secondary cells using higher layer signaling. In some examples of the method, apparatus, and non-transitory computer-readable medium described above, the higher layer signaling comprises radio resource control (RRC) signaling or MAC CE signaling during a secondary cell configuration procedure.

Some examples of the method, apparatus, and non-transitory computer-readable medium described above may further include processes, features, means, or instructions for transmitting a MAC CE instructing the UE to transition a state of at least one secondary cell of the group of secondary cells; determining an allocation of resources for the UE to communicate with the at least one secondary cell; and transmitting an indication of an active BWP used for the allocation of resources in the BWP DCI based at least in part on the determining.

Some examples of the method, apparatus, and non-transitory computer-readable medium described above may further include processes, features, means, or instructions for configuring the at least one secondary cell to be in a full activated state based at least in part on the transmitted MAC CE and the active BWP being a non-zero BWP. Some examples of the method, apparatus, and non-transitory computer-readable medium described above may further include processes, features, means, or instructions for configuring the at least one secondary cell to be in a partially activated state based at least in part on the transmitted MAC CE and the active BWP being a zero BWP.

Some examples of the method, apparatus, and non-transitory computer-readable medium described above may further include processes, features, means, or instructions for configuring the at least one secondary cell to switch from the partially activated state to a fully activated state based at least in part on a BWP switching DCI transmitted on a primary cell without a grant. In some examples of the method, apparatus, and non-transitory computer-readable medium described above, the switching from the partially activated state to the full activated state is further based at least in part on at least one bit of the bitmap.

Some examples of the method, apparatus, and non-transitory computer-readable medium described above may further include processes, features, means, or instructions for configuring the at least one secondary cell to be in a full deactivated state based at least in part on the transmitted MAC CE. Some examples of the method, apparatus, and non-transitory computer-readable medium described above may further include processes, features, means, or instructions for configuring a MAC CE to indicate the group of secondary cells based at least in part on the BWP DCI. Some examples of the method, apparatus, and non-transitory computer-readable medium described above may further include processes, features, means, or instructions for configuring at least one bit of the bitmap to indicate a selection of a primary cell or a state of a group of secondary cells. In some examples of the method, apparatus, and non-transitory computer-readable medium described above, at least one bit of the bitmap comprises a secondary cell indicator. Some examples of the method, apparatus, and non-transitory computer-readable medium described above may further include processes, features, means, or instructions for configuring at least one bit of the bitmap based at least in part on a zero resource allocation.

Another method for wireless communication is described. The method may include receiving a MAC CE; receiving a BWP DCI comprising an indication of an active BWP used for allocation of resources for the UE to communicate with the secondary cell; and transitioning a state of a secondary cell based at least in part on the MAC CE and the active BWP.

Another apparatus for wireless communication is described. The apparatus may include means for receiving a MAC CE; means for receiving a BWP DCI comprising an indication of an active BWP used for allocation of resources for the UE to communicate with the secondary cell; and means for transitioning a state of a secondary cell based at least in part on the MAC CE and the active BWP.

Another apparatus for wireless communication is described. The apparatus may include a processor, memory in electronic communication with the processor, and instructions stored in the memory. The instructions may be operable to cause the processor to receive a MAC CE; receive a BWP DCI comprising an indication of an active BWP used for allocation of resources for the UE to communicate with the secondary cell; and transition a state of a secondary cell based at least in part on the MAC CE and the active BWP.

Another non-transitory computer-readable medium for wireless communication is described. The non-transitory computer-readable medium may include instructions operable to cause a processor to receive a MAC CE; receive a BWP DCI comprising an indication of an active BWP used for allocation of resources for the UE to communicate with the secondary cell; and transition a state of a secondary cell based at least in part on the MAC CE and the active BWP.

In some examples of the method, apparatus, and non-transitory computer-readable medium described above, the state comprises a fully activated state, a partially activated state, or a fully deactivated state. Some examples of the method, apparatus, and non-transitory computer-readable medium described above may further include processes, features, means, or instructions for transitioning the state of the secondary cell to a full activated state based at least in part on the received MAC CE and the active BWP being a non-zero BWP. Some examples of the method, apparatus, and non-transitory computer-readable medium described above may further include processes, features, means, or instructions for transitioning the state of the secondary cell to a partially activated state based at least in part on the received MAC CE and the active BWP being a zero BWP.

Some examples of the method, apparatus, and non-transitory computer-readable medium described above may further include processes, features, means, or instructions for transitioning the state of the secondary cell to a full deactivated state based at least in part on the received MAC CE. Some examples of the method, apparatus, and non-transitory computer-readable medium described above may further include processes, features, means, or instructions for transitioning the state of the secondary cell to a full deactivated state based at least in part on a deactivation timer expiring.

Another method for wireless communication is described. The method may include receiving a BWP DCI from a base station; and identifying a selection of a primary cell or a state of a group of secondary cells based at least in part on at least one bit of a field in the BWP DCI.

Another apparatus for wireless communication is described. The apparatus may include means for receiving a BWP DCI from a base station; and means for identifying a selection of a primary cell or a state of a group of secondary cells based at least in part on at least one bit of a field in the BWP DCI.

Another apparatus for wireless communication is described. The apparatus may include a processor, memory in electronic communication with the processor, and instructions stored in the memory. The instructions may be operable to cause the processor to receive a BWP DCI from a base station; and identify a selection of a primary cell or a state of a group of secondary cells based at least in part on at least one bit of a field in the BWP DCI.

Another non-transitory computer-readable medium for wireless communication is described. The non-transitory computer-readable medium may include instructions operable to cause a processor to receive a BWP DCI from a base station; and identify a selection of a primary cell or a state of a group of secondary cells based at least in part on at least one bit of a field in the BWP DCI.

DETAILED DESCRIPTION

Figure 1:
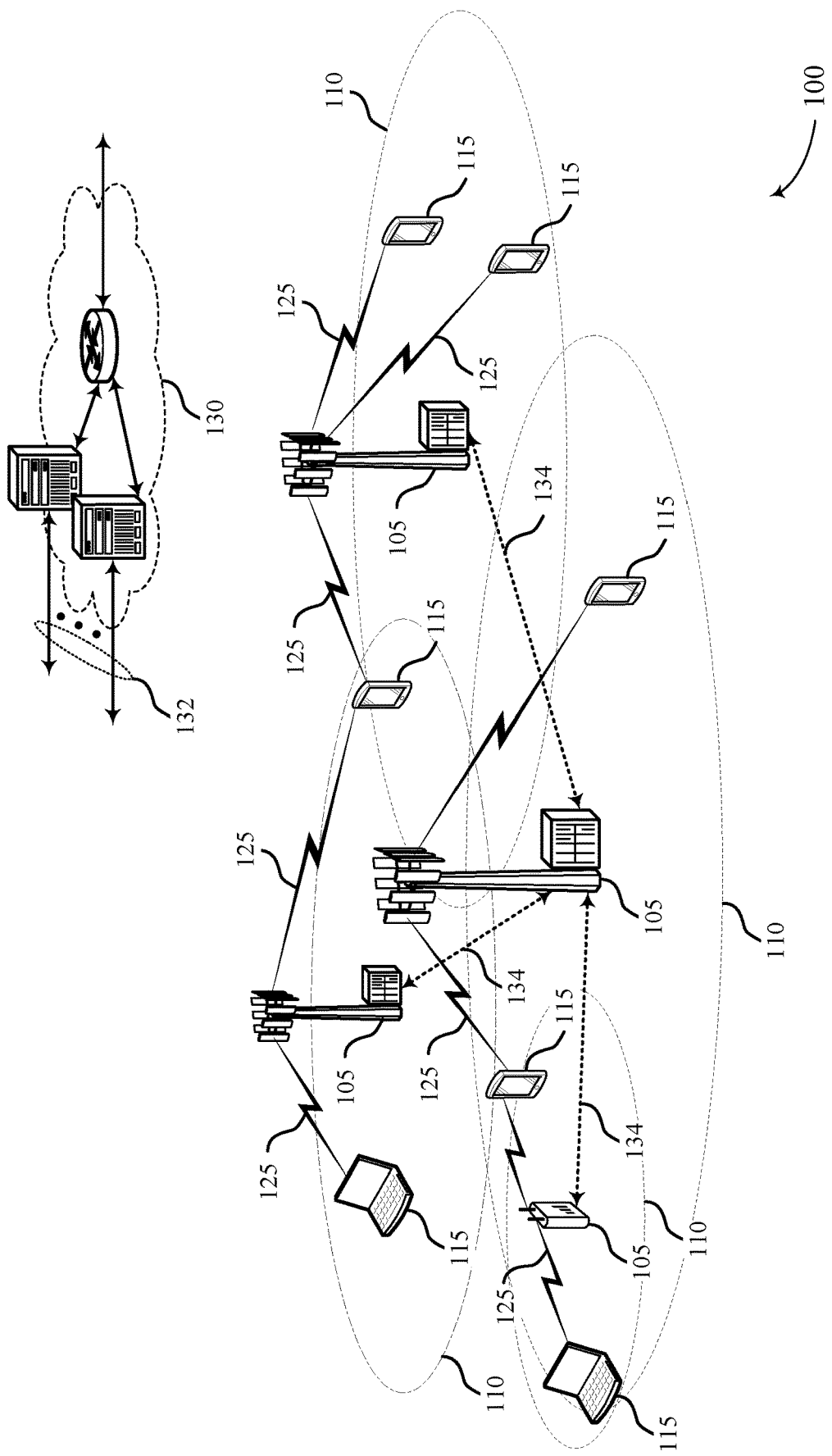
FIG. 1 illustrates an example of a system for wireless communication that supports secondary cell activation and deactivation enhancements in new radio in accordance with aspects of the present disclosure.

A base station may instruct a user equipment (UE) to activate or deactivate a secondary cell based on a change in data throughput requirements for the UE. In some examples, a period to activate or deactivate a secondary cell may be proportional to a latency associated with performing radio frequency bandwidth adaptation. For instance, in some examples of wireless communication systems such as Long-Term Evolution (LTE), secondary cell activation may be signaled to a UE via a medium access control (MAC) control element (CE). For example, a bit field in the MAC CE may indicate an activation or deactivation status of one or more secondary cells. Additionally, secondary cell deactivation may be signaled to a UE via a MAC CE or alternatively by using a timer (e.g., expiration of a secondary cell deactivation timer).

In some cases, using MAC CE to indicate secondary cell activation or deactivation in next generation 5G or millimeter wave (mmW) new radio systems may have a higher latency compared to providing an indication of bandwidth part (BWP) adaptation to the UE via downlink control information (DCI) signaling. That is, when the secondary cell is activated it remains activated for an extended duration, to reduce the occurrences of signaling because of the greater overhead in terms of the resources usage and latency associated with MAC CE signaling for secondary cell activation or deactivation. In addition, by having the secondary cell remain activated for extended periods, power consumption for the UE may also be effected due to physical downlink control channel (PDCCH) monitoring on the activated secondary cell. In one example, for intra-band carrier aggregation, the receiver bandwidth of a UE may be a wideband radio frequency. As such, benefits associated with low latency BWP adaptation for the UE would be undermined if secondary cell activation or deactivation became a bottleneck. As a result, consistency between BWP and secondary cell activation or deactivation may be desirable. In some examples, to reduce latency signaling associated with secondary cell activation and deactivation, the base station may configure a DCI format that may include a bitmap for secondary cell activation and deactivation. In further examples, the base station may support a combined approach of MAC CE signaling and BWP DCI for secondary cell activation and deactivation.

The base station may transmit a first signal instructing the UE to transition a state of a secondary cell associated with the UE. The base station may determine an allocation of resources for the UE to communicate with the secondary cell, and transmit a second signal including an indication of an active BWP used for the allocation of resources based on the determining. The active BWP and the first signal may indicate the transition of the state of the secondary cell. In some examples, the first signal may include a MAC CE and the second signal may include a BWP DCI. The UE may receive the MAC CE from the base station, and subsequently also receive the BWP DCI including an indication of an active BWP used for allocation of resources for the UE to communicate with the secondary cell. The UE may transition a state of a secondary cell based on the MAC CE and the active BWP. An active BWP may be a non-zero BWP that may be equivalent to the case where at least one BWP is activated. A non-zero BWP may be a narrowband or wideband. In some cases, a non-zero BWP may include one or more BWPs configured with bandwidth greater than zero and up to a minimum of a maximum of the UE bandwidth and a component carrier bandwidth of the UE.

In some cases, a base station may configure a secondary cell to be in a full activated state based on the transmitted first signal and the active BWP being a non-zero BWP. In some cases, the base station may configure the secondary cell to be in a dormant state (previously referred to as "a gated state") based on the transmitted first signal and the active BWP being a zero BWP. The dormant state may also hereby be referred to as a partially activated state. The base station may alternatively configure the secondary cell to be in a full deactivated state based on the transmitted first signal. In some cases, the UE may transition the state of the secondary cell to a full activated state based on the received MAC CE and the active BWP being a non-zero BWP. The UE may transition the state of the secondary cell to a dormant state based on the received MAC CE and the active BWP being a zero BWP. The UE may transition the state of the secondary cell to a full deactivated state based on the received MAC CE.

Aspects of the disclosure are initially described in the context of a wireless communications system. Exemplary UEs and base stations (e.g., next generation NodeBs (gNBs)), systems, methods, and process flow that supports secondary cell activation and deactivation enhancements in new radio are then described. Aspects of the disclosure are further illustrated by and described with reference to apparatus diagrams, system diagrams, and flowcharts that relate to secondary cell activation and deactivation enhancements in new radio.

FIG. 1 illustrates an example of a system 100 for wireless communication that supports secondary cell activation and deactivation enhancements in new radio in accordance with various aspects of the present disclosure. The system 100 includes base stations 105, UEs 115, and a core network 130. In some examples, the system 100 may be a Long Term Evolution (LTE) network, an LTE-Advanced (LTE-A) network, or a new radio network. In some cases, the system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the system 100 may include uplink transmissions from a UE 115 to a base station 105, or downlink transmissions, from a base station 105 to a UE 115. Downlink transmissions may also be called forward link transmissions while uplink transmissions may also be called reverse link transmissions. The system 100 may configure one or more downlink bandwidth parts (BWPs) and one or more uplink BWPs for each UE-specific serving cell (e.g., a serving cell associated with a base station 105). In some cases, the one or more downlinks BWPs and the one or more uplink BWPs may be configured using dedicated radio resource control (RRC) for a UE 115.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A or new radio network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, base station 105 may transmit a first signal instructing UE 115 to transition a state of a secondary cell associated with the UE 115. For example, base station 105 may be a primary cell for UE 115, and another base station 105 may be a secondary cell for UE 115. Base station 105 may determine an allocation of resources for the UE 115 to communicate with the secondary cell (e.g., another base station 105), and transmit a second signal including an indication of an active BWP used for the allocation of resources based on the determining. The active BWP and the first signal may indicate the transition of the state of the secondary cell. In some examples, the first signal may include a MAC CE and the second signal including a BWP DCI. UE 115 may receive a MAC CE from base station 105. UE 115 may also receive a BWP DCI including an indication of an active BWP used for allocation of resources for the UE to communicate with the secondary cell. The UE 115 may transition a state of a secondary cell based on the MAC CE and the active BWP.

Base station 105 may configure a secondary cell to be in a full activated state based on the transmitted first signal and the active BWP being a non-zero BWP. In some cases, base station 105 may configure the secondary cell to be in a dormant state based on the transmitted first signal and the active BWP being a zero BWP. During periods of low traffic activity, an activated secondary cell may quickly switch to the dormant state. While in the dormant state, UE 115 may rely on a primary cell to maintain a connection (e.g., a connection to a base station 105). In some examples, for an activated secondary cell, the dormant state can be defined as all BWP of the secondary cell being deactivated. In some cases, the secondary cell may be in the dormant state when the active BWP is the zero BWP. In some cases, a default BWP of the secondary cell may be the zero BWP, so that when a BWP timer expires, the secondary cell may autonomously switch to the dormant state. When the secondary cell is in the dormant state, UE 115 may have a reduced active radio frequency bandwidth support and power consumption.

The base station 105 may alternatively configure the secondary cell to be in a full deactivated state based on the transmitted first signal. In some cases, base station 105 may configure the secondary cell to be in a full deactivated state based on a deactivation timer expiring. In some case, UE 115 may transition the state of the secondary cell to a full activated state based on the received MAC CE and the active BWP being a non-zero BWP. UE 115 may transition the state of the secondary cell to a dormant state based on the received MAC CE and the active BWP being a zero BWP. UE 115 may transition the state of the secondary cell to a full deactivated state based on the received MAC CE. UE 115 may transition the state of the secondary cell to a full deactivated state based on a deactivation timer expiring. In some cases, an activated BWP may remain active until a BWP timer expires, or until a subsequent DCI indicates that an activated BWP is to be inactivated. In some cases, a table of combinations of activated BWPs and deactivated BWPs may be configured, and the DCI may include an index into the table to indicate which BWPs are active and which BWPs are inactive. In some cases, the DCI may include a bitmap that indicates which BWPs are active and which BWPs are inactive. In some cases, the UE 115 may transmit an acknowledgment (ACK) or non-acknowledgment (NACK) receipt of the DCI to the base station 105 using resources indicated in the DCI or in preconfigured acknowledgment resources.

In some cases, base station 105 may configure at least one bit of a field in a BWP DCI to indicate selections for activated or deactivated states for a secondary cell and a BWP selection for the base station, and transmit the BWP DCI to UE 115 based on the configuring. In some examples, the configuration may include base station 105 switching to a default BWP based on an expiration of a timer. The timer may be a BWP timer that may be associated with an active duration of a BWP for a primary cell and/or one or more secondary cells. The default BWP may be configured to be a non-zero BWP. In some cases, the configuration may include a subset of or all secondary cells of the group configured to switch from a fully activated state to a dormant state based on an expiration of a timer. The dormant state may be associated with a default BWP including a zero-BWP. Base station 105 may also configure to indicate the group of secondary cells based on the BWP DCI. UE 115 may receive the BWP DCI from base station 105 and identify a selection of a primary cell or a state of a group of secondary cells based on at least one bit of a field in the BWP DCI.

A default BWP (e.g., a default BWP of base station 105) may be active, with any remaining BWPs (e.g., other BWPs of the base station 105 or one or more BWPs of one or more secondary cells) deactivated unless specifically activated by the base station 105. Upon activation of a BWP, the UE 115 may perform channel state information (CSI) measurements and transmit a measurement report. Thus, monitoring and measurements of the deactivated BWPs may be avoided, which may provide power savings and more efficient resource usage. Furthermore, secondary cell activation and deactivation may be signaled based on whether or not a DCI indicates a BWP for one or more secondary cell is activated. In some cases, if any BWP of a secondary cell is activated, the secondary cell may be considered to be activated and if all the BWPs of a secondary cell are deactivated, the secondary cell may be considered to be deactivated. In such a manner, separate signaling for activation and deactivation of secondary cells may be avoided.

System 100 may support configuration of a special BWP (e.g., a zero BWP) which corresponds to all BWPs being in a deactivated state for a secondary cell when it becomes the active BWP on the secondary cell. System 100 may also support zero BWP that may be configured as a default downlink BWP on a secondary cell. In some examples, the zero BWP may not be allowed to be configured as a first active BWP on a secondary cell. In some cases, system 100 may support scheduling DCI with zero assignment for active downlink and/or uplink BWP switching. For downlink scheduling DCI, UEs 115 may transmit positive HARQ ACK for zero-size physical downlink shared channel (PDSCH) transmission. In some cases, when base stations 105 (e.g., gNB) transmit a BWP switching DCI (with zero assignment) on the secondary cell, it may activate a zero BWP to transition the secondary cell to a dormant state (a partially activated state). In some cases, when base stations 105 transmit BWP switching DCI (with zero assignment) on a primary cell, it may include secondary cell control indicator and a bitmap, which selects the secondary cell whose active BWP will be switched to the first active BWP. If a zero BWP is an original active BWP, this may effectively switch the secondary cell out of the dormant state. In some examples, base station 105 may configure a secondary cell (e.g., base station 105) to switch from a dormant state to a full activated state based on a BWP switching DCI transmitted on a primary cell without a grant.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users. The system 100 may also operate in an extremely high frequency (EHF) region of the spectrum (e.g., from 30 GHz to 300 GHz), also known as the millimeter band. In some examples, the system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the system 100 may utilize both licensed and unlicensed radio frequency spectrum bands. For example, the system 100 may employ License Assisted Access (LAA), LTE-Unlicensed (LTE-U) radio access technology, or new radio technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication links 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or new radio may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the system 100, and may be referred to as a transmission time interval (TTI). In other cases, a smallest scheduling unit of the system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, new radio, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the system 100 (e.g., base stations 105 or UEs 115) may have a hardware configuration that supports communications over a particular carrier bandwidth, or may be configurable to support communications over one of a set of carrier bandwidths. In some examples, the system 100 may include base stations 105 and/or UEs that can support simultaneous communications via carriers associated with more than one different carrier bandwidth. The system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, the system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as a new radio system may utilize any combination of licensed, shared, and unlicensed spectrum bands, among others. The flexibility of eCC symbol duration and subcarrier spacing may allow for the use of eCC across multiple spectrums. In some examples, new radio shared spectrum may increase spectrum utilization and spectral efficiency, specifically through dynamic vertical (e.g., across frequency) and horizontal (e.g., across time) sharing of resources.

Figure 2:
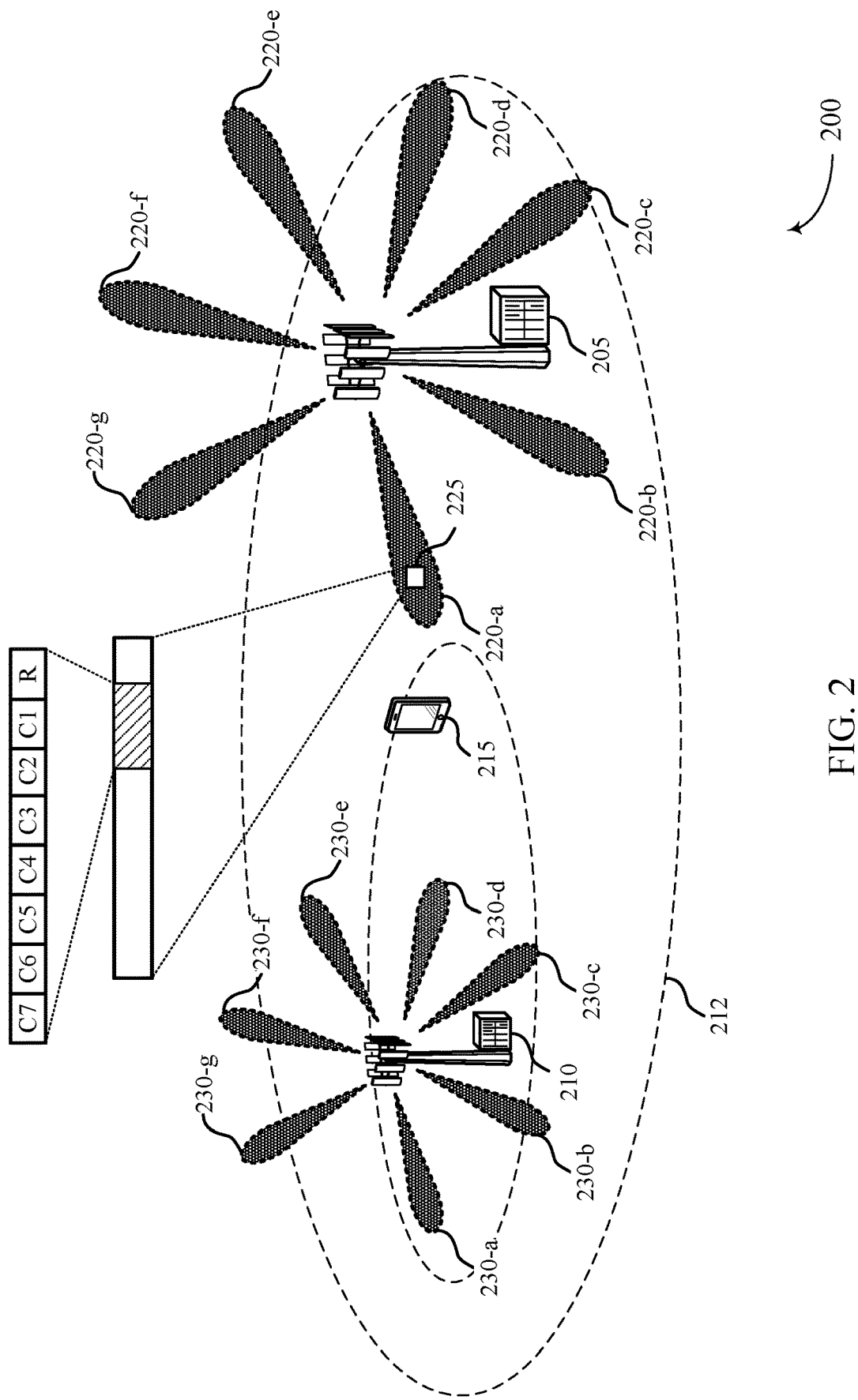
FIG. 2 illustrates an example of a system for wireless communication that supports secondary cell activation and deactivation enhancements in new radio in accordance with aspects of the present disclosure.

FIG. 2 illustrates an example of a system 200 that supports secondary cell activation and deactivation enhancements in new radio in accordance with various aspects of the present disclosure. In some examples, system 200 may implement aspects of system 100. System 200 may include a base station 205, a base station 210, and a UE 215, which may be examples of the corresponding devices described with reference to FIG. 1. System 200 may operate according to a radio access technology such as a next generation 5G or millimeter wave (mmW) new radio system, although techniques described herein may be applied to any radio access technology (e.g., Long-Term Evolution (LTE), LTE-advanced (LTE-A)) and to systems that may concurrently use two or more different radio access technologies (e.g., next generation 5G mmW new radio and LTE). Base station 205 may be associated with a coverage area 235, and base station 210 may be associated with a coverage area 240. Aspects of the following communication examples are described as occurring between base station 205, base station 210, and UE 215.

UE 215 may be configured with dual-connectivity, where UE 215 may receive data transmitted by or transmit data to base station 205 or base station 210. Base station 205 may be a primary cell next generation NodeB (gNB) or evolved NodeBs (eNBs), and base station 210 may be a secondary cell, such as a secondary gNB (SgNB). When operating in dual-connectivity mode, UE 215 may have increased data transmission capabilities, but may also have increased power consumption. For example, power consumption for UE 215 may be increased in dual-connectivity because UE 215 may be monitoring for and receiving data transmissions from both base station 205 and base station 210. System 200 may efficiently manage data transmission capabilities, while also decreasing power consumption for UE 215 by providing improved secondary cell activation and deactivation techniques for base station 205 and UE 215.

Base station 205 may configure UE 215 with one or more component carriers. In some examples, a subset of the component carriers may be deactivated except a primary component carrier. In some cases, base station 205 may activate one or more secondary component carriers, in addition to the primary component carrier, to increase a downlink throughput. For example, if data throughput is relatively low or the data has a relatively high latency target, base station 205 as a primary cell may instruct UE 215 to activate or deactivate a secondary cell (e.g., base station 210). UE 215 may also be configured to support carrier aggregation to increase a receiver bandwidth for data transmission from base station 205 or base station 210. Each aggregated carrier may be referred to as a component carrier. In some cases, UE 215 may use contiguous component carriers within a same operating frequency band (e.g., intra-band carrier aggregation), or non-contiguous component carriers belonging to the same operating frequency with a gap between the component carriers. In some cases, during downlink operations, power consumption by UE 215 increases with the size of configured radio frequency receiver bandwidth. Because UE 215 receives data transmissions discontinuously from base station 205 or base station 210, UE 215 may support variable receiver bandwidth. In one example, for intra-band carrier aggregation, the receiver bandwidth of UE 215 may be a wideband radio frequency. In another example, UE 215 may monitor a downlink control channel (e.g., physical downlink control channel (PDCCH)) using a smaller radio frequency bandwidth (e.g., narrowband) and receive data using a larger radio frequency bandwidth (e.g., wideband), based on a bandwidth configuration.

Bandwidth configuration may include base station 205 providing a bandwidth part (BWP) adaptation for UE 215. A BWP may include a number of resource blocks allocated to UE 215 for communicating with base station 205 or base station 210. In some cases, multiple component carriers may be configured according to carrier aggregation techniques, which may include a primary carrier (also referred to as a primary cell carrier or primary cell) and one or more secondary component carriers (also referred to as secondary cell carriers or secondary cells). Each component carrier may have one or more BWPs. For example, if a relatively small amount of data is to be transferred between UE 215 and base station 205, a single BWP may be used for a transmission, and if a relatively large amount of data is to be transferred, two or more BWPs may be used for the transmission. Bandwidth parts may be configured with different bandwidth. Narrow bandwidth may be configured for BWP to be used if the amount of data to be transferred is small; and wider bandwidth may be configured otherwise. UE 215 may dynamically switch between BWPs (e.g., from narrowband to wideband) based on the bandwidth configuration.

In some cases, to reduce a power consumption of UE 215, base station 205 may configure BWPs for UE 215 to support dynamic bandwidth adaptation. Base station 205 may signal a BWP activation, a BWP deactivation, or a BWP switching, or any combination thereof via DCI signaling. For a single carrier, UE 215 may dynamically adapt a radio frequency bandwidth based on a BWP switching signaled in a DCI from base station 205. Dynamically adapting (i.e., switching) between a BWP with a narrowband bandwidth and a BWP with a wideband bandwidth may result in power saving for UE 215.

In some cases for carrier aggregation, power saving for UE 215 may be more complicated compared to the single carrier case. That is, a BWP adaptation for each carrier, from e.g., a BWP with a narrowband bandwidth to a BWP with a wideband bandwidth, may not be as effective in producing a same power saving result for UE 215 compared to the single carrier case. For example, intra-band contiguous carrier aggregation that employs a wideband radio frequency receiver, power saving for UE 215 may be less evident. In some cases including multiple activated secondary cells (e.g., SgNBs), even if these secondary cells operate with narrowband BWP, an overall receiver's (i.e., UE 215) radio frequency bandwidth may not be reduced by a significant amount, because the receiver's radio frequency bandwidth may be based on an overall span of all of the secondary serving cells active BWPs, and not by the bandwidth of a single active BWP.

For example, considering a component carrier bandwidth of 400 MHz for base station 205, base station 205 may configure one or more UE configurations including: a single wideband component carrier also of 400 MHz bandwidth, and an intra-band contiguous component carrier including four carriers each with 100 MHz bandwidth. For the first UE configuration (i.e., single wideband component carrier), dynamic BWP adaptation may be effective in achieving power saving for UE 215. In some examples, base station 205 may configure a 40 MHz bandwidth for narrowband BWP and a 400 MHz bandwidth for a wideband BWP, and configure UE 215 to dynamically switch between the two based on receiving DCI signaling indicating the BWP adaptation/switch from base station 205. Alternatively, for the second UE configuration (i.e., intra-band contiguous component carriers), assuming a same ratio between BWPs, a bandwidth may be configured to include 10 MHz for narrowband BWP and 100 MHz for wideband BWP. In this cases, even if all carriers are switched to a narrowband BWP, the overall receiver's (i.e., UE 215) radio frequency bandwidth cannot be reduced substantially as compared to the single wideband component carrier case. Instead, the overall receiver's radio frequency bandwidth would be reduced to, for example, 220 MHz (e.g., 2×(100 MHz)+ 2×(10 MHz)=220 MHz.

Base station 205 may indicate an activation of a BWP to UE 215 based on DCI signaling. The DCI signaling may be exclusive from a downlink grant and the BWP. By using DCI signaling to indicate activation of a BWP, power consumption of UE 215 may be reduced due to the low latency associated with the DCI signaling. In some cases, UE 215 may establish a connection with base station 205 in which one or more component carriers may be configured with one or more BWPs. Base station 205 may indicate which BWP is active for a transmission in DCI that is transmitted subsequent to the configuration of the one or more component carriers, and UE 215 may activate a corresponding BWP or component carrier based on the indication.

In some cases, base station 205 may configure one or more secondary cells to switch from a dormant state to a full activated state based on a BWP switching DCI transmitted on a primary cell without a grant. The BWP switching DCI may include a BWP activation control information for the one or more secondary cells associated with UE 215. In some cases, base station 205 may configure the secondary cell to switch from the dormant state to a full activated state based on a BWP switching DCI transmitted on a primary cell. The BWP switching DCI may include a control field indicator (CIF).

In some cases, base station 205 may instruct UE 215 to activate or deactivate a secondary cell (e.g., base station 210) based on a change in data throughput requirements for UE 215. In some examples, a duration to activate or deactivate a secondary cell (e.g., base station 210) may be directly proportional to a latency associated with performing radio frequency bandwidth adaptation. For instance, in some examples of wireless communication systems such as Long-Term Evolution (LTE), secondary cell activation may be signaled to a UE via a medium access control (MAC) control element (CE). For example, a bit field in the MAC CE may indicate an activation or deactivation status of one or more secondary cells (e.g., base station 210). Additionally, secondary cell deactivation may be signaled to a UE via a MAC CE or alternatively by using a timer (e.g., expiration of a secondary cell deactivation timer). However, using MAC CE to indicate secondary cell activation or deactivation in next generation 5G or mmW new radio systems e.g., to UE 215 may have a higher latency compared to providing an indication of BWP adaptation to UE 215 via DCI signaling. That is, secondary cell activation has a higher overhead because when the secondary cell is activated it remains activated for an extended duration because of the high latency associated with base station 205 instructing UE 215 to deactivate a secondary cell (e.g. base station 210) using MAC CE signaling, compared to the BWP adaptation indication via DCI signaling. In addition, power consumption for UE 215 is also effected, by having the secondary cell remain activated for extended periods, due to PDCCH monitoring on the activated secondary cell by UE 215. As such, benefits associated with low latency BWP adaptation for UE 215 would be undermined if secondary cell activation or deactivation became a bottleneck for system 200. As a result, consistency between BWP and secondary cell activation or deactivation may be desirable.

In some examples of next generation 5G or mmW new radio systems, UE 215 may be configured with new radio tracking reference signal framework that may allow express BWP adaptation compared to, for example, LTE loop convergence based on cell-specific reference signals. As a result, UE 215 may be capable to report valid channel state information earlier than the 24 millisecond (ms) (e.g., n+24 timeline in LTE). MAC CE signaling compared to DCI signaling may have proportionally higher impact to the overall reporting of channel state information.

Secondary cell activation or deactivation using DCI signaling may be faster (e.g., have a lower latency) and more efficient compared to conventional techniques. For example, MAC CE signaling may include the following disadvantages that may affect data throughput, efficiency, and processing resources and power consumption of UE 215: extra latency due to PDSCH decoding, a 10% block error rate on a first transmission, hybrid automatic repeat request (HARD) delay, and L2 delay, among others. DCI signaling however may remedy some or all of these disadvantages of MAC CE signaling e.g., DCI signaling may reduce the latency by at least 60% even when considering similar acknowledgment or non-acknowledgment delay related to PDSCH data transmission.

In some examples, to reduce latency signaling associated with secondary cell activation and deactivation, base station 205 may configure a downlink control information (DCI) format that may include a bitmap for secondary cell activation and deactivation. In some case, the bitmap may follow features from those included in MAC CE. For example, base station 205 may reconfigure a DCI format to include bitmap provided by existing MAC CEs. This reconfigured DCI format may also be referred to as a L1-CE. That is, control elements transmitted using MAC CE signaling may be transmitted by base station 205 using DCI signaling.

In some cases, a BWP DCI of a primary cell (e.g., base station 205) may carry a control bitmap associated with one or more secondary cells. Based on the control bitmap, individual secondary cells may be signaled to transition to another BWP from a zero BWP. To conserve the number of bits used in the control bitmap, at least one bit may be assigned to each secondary cell. For example, at least one bit of the bitmap may include a secondary cell indicator (e.g., identifier (ID)). In some examples, if the at least one bit is set, the secondary cell may transition to a first BWP which is preconfigured. Alternatively, in some examples, only activated secondary cells may be mapped to the control bitmap.

Base station 205 may also reconfigure a downlink grant to include an indication instructing UE 215 to activate or deactivate a secondary cell (e.g., base station 210). For example, base station 205 may configure a DCI to include a bitmap for secondary cell activation and deactivation. In some examples for BWP switching, base station 205 may configure a field in a BWP DCI that may indicate a BWP identifier (ID) field. As such, for a downlink grant transmitted from base station 205 to UE 215, UE 215 may identify the intended BWP. For example, UE 215 may operate and receive on a first BWP, a downlink grant from base station 205. The downlink grant may include a first field including a bitmap for secondary cell activation or deactivation and a second field indicating a BWP ID that may indicate a second BWP, which UE 215 may transition to. Thus, base station 205 may transmit a BWP DCI that includes downlink grant information, bitmap for secondary cell activation and deactivation, and a BWP ID for UE 215.

Base station 205 or base station 210 may be a mmW base station that may transmit a beamformed transmission on an active beam to UE 215. For example, base station 205 may transmit a BWP DCI 225 on an active beam to UE 215 via beamformed transmission 220-a. The BWP DCI 225 may include a bitmap, as described herein, with a number of bits related to one or more secondary cells. In some cases, a bitmap may include a number of bits (e.g., at least one bit or eight bits). Base station 205 may use each bit to indicate a status of a secondary cell e.g., an activation or deactivation status of a secondary cell. For example, a bit value "1" may indicate that a secondary cell is activated or to be activated by UE 215, and a bit value "0" may indicate that a secondary cell is deactivated or to be deactivated by UE 215. In some examples, at least one bit of the bitmap may be reserved (e.g., for padding purposes).

In some cases, a number of secondary cells supported and configured by base station 205 may be resource extensive for indicating all secondary cells in the BWP DCI 225. That is, a bitmap may be exceed a length to transmit within available bits in the BWP DCI 225. Base station 205 may also support N secondary cells using M bits, where N and M are positive integers. For example, base station 205 may have 31 configured secondary cells (including base station 210). The BWP DCI 225 may have eight bits available for a bitmap, and thus may be incapable of supporting a bitmap with 31 bits. To remedy the issues related to bit availability in the BWP DCI 225, base station 205 may group multiple secondary cells to be associated with at least one bit. For example, a first set of secondary cells (e.g., secondary cells 1 through 8) may be assigned to a first bit (C1) and a second set of secondary cells (e.g., secondary cells 9 through 16) may be assigned to a second bit (C2), etc.

Base station 205 may use higher layer signaling to signal to UE 215 grouping of secondary cells. Higher layer signaling may include radio resource control (RRC) signaling or MAC CE signaling during secondary cell configuration. In some cases, base station 205 may indicate grouping of secondary cells using higher layer signaling, and use BWP DCI to indicate activation or deactivation of individual secondary cells of a group. For example, base station 205 may indicate a group of secondary cells (e.g., secondary cells 1 through 8) using higher layer signaling, and subsequently transmit BWP DCI 225 including a bitmap indicating activation or deactivation of individual secondary cells of the group (e.g., the second and fourth secondary cell of the group are to be activated). In some examples, the BWP DCI 225 may support an additional bit that may indicate a group of secondary cells. The BWP DCI 225, in this case, may have a bit location corresponding to a group associated with the second and fourth secondary cell and a bit value indicating that these cells are to be activated. As such, UE 215 may first identify a group of secondary cells based on a bit value in a group field in a higher layer signaling message, and then identify the individual secondary cells for activation or deactivation in a BWP DCI. Additionally, UE 215 may activate or deactivate a secondary cell based on an AND operation i.e., for a secondary cell to be activated or deactivated both the MAC CE and the BWP DCI may have to indicate an activation or deactivation indication.

A transmission from base station 205 may be a beamformed or directional transmission directed towards UE 215. For example, base station 205 may perform a beam sweep by beamformed transmission 220-a through 220-g. Base station 205 may transmit downlink signals in a beamformed manner and sweep through the angular coverage region for the geographic coverage area 212. Each beamformed transmission 220-a through 220-g may be transmitted in a beam sweeping operation in different directions so as to cover the geographic coverage area 212 of base station 205. For example, beamformed transmission 220-a may be transmitted in a first direction, beamformed transmission 220-b may be transmitted in a second direction, beamformed transmission 220-c may be transmitted in a third direction, beamformed transmission 220-d may be transmitted in a fourth direction, etc.

The beamformed transmission 220-a through 220-g may additionally be transmitted at variable beam widths, at different elevation angles, etc. In some examples, beamformed transmission 220-a through 220-g may be associated with a beam index, e.g., an indicator identifying a beam associated with a beamformed transmission. Base station 205 may, additionally or alternatively, transmit beamformed transmission 220-a through 220-g during different symbol periods of a subframe or slot. For example, base station 205 may transmit beamformed transmission 220-a during a first symbol period (e.g., symbol 0), beamformed transmission 220-*b* during a second symbol period (e.g., symbol 1), beamformed transmission 220-*c* during a third symbol period (e.g., symbol 2), beamformed transmission 220-*d* during a fourth symbol period (e.g., symbol 3), etc.

By configuring a new DCI format or reconfiguring an existing DCI format, base station 205 may substitute MAC CE signaling with DCI signaling for secondary cell activation and deactivation. Hence, reducing latency in system 200 and decreasing power consumption by UE 215. This technique also supports concurrent BWP switching on a primary cell (e.g., base station 205) and secondary cell activation or deactivation (e.g., base station 210), which may minimize radio frequency disruption in system 200. As a result, base station 205 may signal to UE 215 in a BWP DCI both BWP switching and secondary cell activation and deactivation instructions, simultaneously.

Figure 3:
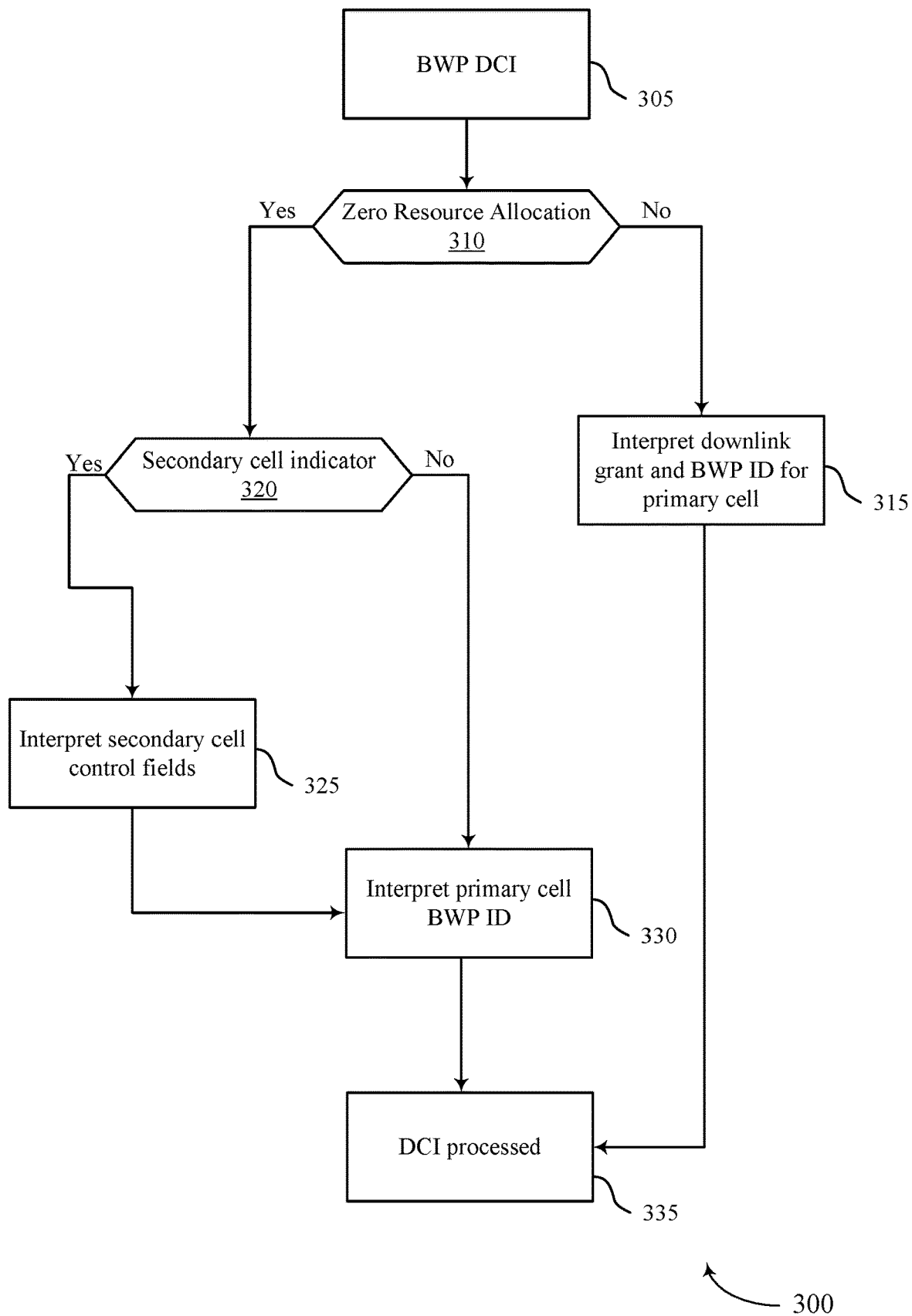
FIG. 3 illustrates an example of a method that supports secondary cell activation and deactivation enhancements in new radio in accordance with aspects of the present disclosure.

FIG. 3 illustrates an example of a method 300 that supports secondary cell activation and deactivation enhancements in new radio in accordance with various aspects of the present disclosure. In some cases, method 300 may illustrate an example technique for parsing fields of a BWP DCI. In some examples, method 300 may implement aspect of system 100 and 200. The operations of method 300 may be implemented by a UE or its components as described herein. For example, method 300 may be implemented by UE 215. In some example, UE 215 may execute a set of codes to control the functional elements of UE 215 to perform the functions described below. Additionally, or alternatively, UE 215 may perform aspects of the functions described below using special-purpose hardware.

At 305, UE 215 may receive a BWP DCI. For example, UE 215 may receive the BWP DCI from base station 205 via a beamformed transmission. The BWP DCI may be a downlink grant including information associated with active BWP(s), secondary cell activation or deactivation instructions, or a BWP ID, or any combination thereof.

In some examples, group of secondary cells BWP signaling may be supported in a single DCI. For instance, M secondary cells may require BWP signaling, and N bits for a control bitmap may be required to signal the M secondary cells, where M and N are positive integers. In order to use more bits for the M secondary cell BWP signaling, base station 205 may reconfigure a DCI format. For example, a DCI format may use one bit for resource assignment indication (e.g., resource assignment valid/invalid), 25 bits for resource assignment for 20 MHz BWP, five bits for modulation coding scheme (MCS) indication, 3 or 4 bits for HARQ ID, two bits for redundancy version (RV), and two bits for physical uplink control channel (PUCCH) resources. Base station 205 may reconfigure the DCI format by adding a two bit field for BWP ID. In some examples, a DCI format may be reconfigured to have a BWP ID field indicating a target BWP ID and a number of fields for downlink grant, when providing BWP switching for base station 205 (e.g., a primary cell) via scheduling (e.g., a valid downlink grant with BWP ID information). In some cases, a BWP DCI may be formatted without scheduling information (e.g. a dummy grant). This may be indicated by a zero-resource assignment. In this case, the DCI format may be reconfigured to have bits associated with the MCS, HARQ ID, and RV fields nulled. In some cases, base station 205 may reconfigure the DCI format to indicate secondary cell activation and deactivation by using zero-resource assignment and reassigning the MCS, HARQ ID, and RV fields for secondary cell activation and deactivation control fields. For example, in some examples of wireless communication systems such as LTE, the MCS, HARQ ID, and RV fields may occupy 10 bits. Base station 205 may reconfigure the 10 bits e.g., by having one bit for secondary cell activation or deactivation indication and the remaining nine bits for secondary cell activation or deactivation control information. In some examples, a same cell radio network temporary identifier (C-RNTI) for the reconfigured DCI format may be used. In some cases, normal primary cell BWP switching signaling may have two modes. A first mode with scheduling may include populating a BWP ID with a target BWP ID, and remainder of fields may be a downlink grant. A second mode without scheduling may include indicating zero resource assignment that may indicate e.g., the MCS, the HARQ ID, and the RV fields as nulled.

In some cases, base station 205 may introduce a CIF field in a BWP switching DCI to signal BWP switching in DCI for secondary cells. The base station 205 may alternatively provide an enhanced BWP switching DCI on the primary cell. If zero resource assignment is supported, many fields can be repurposed for secondary cell BWP control bitmap. The base station 205 may in some cases, provide dedicated RNTI for DCI containing secondary cell BWP control bitmap.

At 310, UE 215 may determine whether a zero-resource assignment is valid for the BWP DCI. In some cases, (e.g., for LTE resource allocation type 0) zero-resource assignment may be indicated in a resource allocation field. For instance, in a resource allocation type 0, setting all bits in the resource allocation field may indicate zero-resource assignment. In some examples, the BWP DCI may have a field for a zero-resource assignment indication, and UE 215 may determine whether the zero-resource assignment is valid (e.g., used) based on a bit value of the field. For example, a bit value set to "1" may be an indication that zero-resource assignment is inapplicable. In the case that zero-resource assignment is inapplicable, UE 215 may at 315 interpret downlink grant and BWP ID for a primary cell. In this case, the BWP DCI may be a regular downlink grant including an active BWP ID and resource block groups allocated for communicating with base station 205 (e.g., primary cell). A BWP may be configured with different bandwidth. Narrow bandwidth may be configured for BWP to be used if the amount of data to be transferred is small; and wider bandwidth may be configured otherwise. UE 215 may dynamically switch between BWP (e.g., from narrowband to wideband) based on the BWP ID provided in the BWP DCI.

Alternatively, in the case that zero-resource assignment is applicable, UE 215 may at 320 parse the BWP DCI to identify a secondary cell indicator. A downlink grant having a zero-resource assignment may be a dummy grant (i.e., no actual allocation of resources may be provided to UE 215 because the downlink grant fields are zeroed). The secondary cell indicator may specify to UE 215 presence of a bitmap for secondary cell activation or deactivation. The bitmap may include a number of bits, that correspond to the number of secondary cells whose BWP can be activated based on a set value of each corresponding bit in the bitmap. If a bit value is set, a corresponding secondary cell (if activated) may switch to a first active BWP. Alternatively, if the bit value is not set the corresponding secondary cell (is not already activated) no action is taken. If UE 215 determines that a secondary cell indicator exists, UE 215 may at 325 interpret secondary cell control fields. That is, UE 215 may process a bitmap associated with secondary cell activation or deactivation to determine which cells are indicated as activated or deactivated. However, if UE 215 determines that no secondary cell indicator exists i.e., the received BWP DCI does not include any information associated with secondary cell activation or deactivation, UE 215 may at 330 interpret a primary cell (e.g., base station 205) BWP ID. In some cases, UE 215 may regardless of the secondary cell indicator existing, interpret the primary cell BWP ID. In response to identifying the downlink grant and BWP ID at 315 or 330, UE 215 may at 335 determine that the BWP DCI has been completely processed.

In some examples, UE 215 may transmit an acknowledgment (ACK) or non-acknowledgment (NACK) message to base station 205 to indicate whether decoding of the BWP DCI was successful or unsuccessful. In some cases, even where zero-resource assignment is applicable (e.g., dummy grant for downlink resource allocation), UE 215 may transmit an ACK or NACK message on PUCCH resources. Hence, reliability associated with using BWP DCI signaling may be provided in system 200.

With reference to FIG. 2, in some cases, base station 205 may provide a secondary cell activation or deactivation status based on MAC CE and BWP. In this case, UE 215 may determine that a secondary cell or a group of secondary cells are fully activated, partially activated or partially deactivated (where partially activated or partially deactivated are also referred to as "in a dormant state"), or fully deactivated based on the MAC CE or the BWP, or both. For example, UE 215 may determine that one or more secondary cells are fully activated when UE 215 receives an indication or instructions in a MAC CE from base station 205, and determines that an active BWP is any configured BWP other than a zero-BWP. An active BWP being a non-zero BWP may be equivalent to the case where at least one BWP is activated. A non-zero BWP may be a narrowband or wideband. In some cases, a non-zero BWP may include one or more BWP configured with bandwidth greater than zero and up to a minimum of a maximum UE 215 bandwidth and a component carrier bandwidth of UE 215. In some cases, system 200 may be configured such that a single BWP is active at a time. UE 215 may also infer that one or more secondary cells are activated based on the configured BWP being a non-zero BWP.

In another example, UE 215 may determine that one or more secondary cells are in a dormant state, when UE 215 receives an indication in a MAC CE from base station 205, and determines that an active BWP is a zero-BWP. For example, base station 205 may indicate to UE 215 that a secondary cell or a group of secondary cells are in a dormant state by transmitting a MAC CE to UE 215. UE 215 may receive the MAC CE indicating the dormant state secondary cell(s). UE 215 may also determine that an active configured BWP is a zero-BWP. An active BWP being a zero-BWP may be equivalent to the case where none of the BWP is activated (i.e., all BWPs are deactivated). As such, no transmission may be supported between the secondary cell(s) and UE 215.

When a secondary cell is in a dormant state (i.e., active BWP is zero BWP), UE 215 may refrain from monitoring a PDCCH on the secondary cell, and may not receive signaling within the cell. In other words, when an active BWP for the secondary cell is the zero BWP, UE 215 may not monitor the PDCCH and base station 205 may be unable to trigger a BWP switching on the secondary cell (e.g., base station 210) based on signaling within the secondary cell. In some cases, some form of cross-cell signaling from a primary cell may be used in order to switch the active BWP of the secondary cell from the zero BWP. For example, a BWP switching DCI may be transmitted on a primary cell (e.g., base station 205) to schedule and switch the BWP of the secondary cell indicated in a control indicator field (CIF). However, in some cases, cross-carrier scheduling for secondary cell dormancy may be undesirable, and a group secondary cell signaling may not be supported.

In some examples, UE 215 behavior on the BWP that is deactivated may include, but is not limited to: no transmission on an uplink shared channel on the BWP, no monitoring of the PDCCH on the BWP, no transmission on PUCCH on the BWP, no transmission on physical random access channel (PRACH) on the BWP. UE 215 behavior on the BWP that is deactivated may also include no flushing of HARQ buffers when performing BWP switching (unless an issued is identified with the HARQ buffers).

In some cases, gap-based operations may be supported by base station 205, base station 210, and UE 215, even with the active BWP being a zero-BWP. The gap-based operations may include radio resource measurement (RRM) measurements, CSI measurements, channel quality information (CQI), sounding reference signal (SRS), power head room (PHR) reporting, contention-based random access channel (RACH) procedure, or any combination thereof. In some examples, the dormant state of the secondary cell(s) may also be a power saving state for UE 215. For example, UE 215 may be capable to switch a radio frequency receiver to sleep mode during a zero-BWP. In some cases, a dormant state may be configured for one or more secondary cells that are in an activated state.

In some cases, switching to a dormant state may be based on BWP switching DCI on the secondary cell indicating that a zero BWP should be activated. For example base station 205 may transmit to UE 215 a BWP switching DCI on the secondary cell indicating switching to a zero BWP for the secondary cell. The BWP switching DCI may be transmitted without a grant. In addition, this DCI may carry zero resource assignment because it is useless to allocate resources on a zero BWP. Additionally, UE 215 may transmit HARQ acknowledgment on a configured PUCCH resource associated with the DCI that may be based on a downlink grant. In some cases, exiting the secondary cell dormant state may be based on the control bit map associated with a BWP switching DCI carried on a primary cell. This BWP switching DCI may carry zero resource assignment for the primary cell and include a secondary cell control indicator in addition to the control bitmap. A BWP ID field may be present in the control bitmap that may indicate which BWP on the primary cell should get activated. Here, UE 215 may also transmit a HARQ acknowledgment on the configured PUCCH resources.

In some examples, UE 215 may be capable to transition in and out of a zero-BWP via BWP DCI signaling or by a BWP timer expiration. In the case of using a BWP timer expiration, after the timer expires UE 215 may automatically switch to a default BWP. The default BWP may be configured by base station 205, and may be a zero-BWP, a narrowband BWP, or a wideband BWP. For example, after the BWP timer expires and the default BWP is a zero-BWP, UE 215 may switch the radio frequency receiver to a low power sleep mode. In some cases, cross-cell BWP switching DCI may be used to transition from a zero-BWP to another BWP (e.g., narrowband or wideband). In some cases, a zero-BWP may indicate that all secondary cells are deactivated. For example, UE 215 may determine or infer that one or more secondary cells are fully deactivated based on the MAC CE and based on an active BWP being a zero-BWP. By exploiting both MAC CE and BWP DCI to indicate an activation or deactivation state of a secondary cell, system 200 may eliminate redundancy between MAC CE and DCI signaling.

Base station 205 may configure a DCI format to include at least two bits for a BWP ID. In some cases, the two bits may be configured to provide information associated with base station 205 and base station 210. For example, a first bit may indicate a BWP type (e.g., narrowband, wideband, zero-bandwidth) selection for base station 205 (e.g., a primary cell) based on a bit value of the first bit, and a second bit may provide activation or deactivation for a configured secondary cell based on a bit value of the second bit. For example, for the first bit, a bit value "0" may indicate a zero-BWP and a bit value "1" may indicate a narrowband BWP or wideband BWP. In another example, for the second bit, a bit value "0" may indicate that the secondary cell is deactivated and a bit value "1" may indicate that the secondary cell is activated. In some examples, base station 205 may support more than two configured BWP in a BWP ID field by configuring the BWP ID field to support more than two bits. For example, to support four BWPs for a primary cell the BWP ID field may be configured with at least three bits.

In some cases where base station 205 may indicate an activation or deactivation status of a group or subset of secondary cells via higher layer signaling (e.g., MAC CE), at least one bit of the two bits associated with the BWP ID may indicate the activation or deactivation of the group or subset of secondary cells. For example, a first bit may indicate a BWP type (e.g., narrowband, wideband, zero-bandwidth) selection for base station 205 (e.g., a primary cell) based on a bit value of the first bit, and a second bit may provide activation or deactivation for a group or subset of configured secondary cells based on a bit value of the second bit. For example, for the first bit, a bit value "0" may indicate a zero-BWP and a bit value "1" may indicate a narrowband BWP or wideband BWP. In another example, for the second bit, a bit value "0" may indicate that the group or subset of configured secondary cells are deactivated and a bit value "1" may indicate that the group or subset of configured secondary cells are activated. By using MAC CE and BWP DCI to signal activation or deactivation of secondary cells, may improve efficiency in system 200 and reduce power consumption of UE 215.

In some case, UE 215 may switch to a default BWP based on an expiration of a timer associated with a primary cell (e.g., base station 205). The timer may include a threshold amount of time that UE 215 has not received any data on from the primary cell. For example, UE 215 may switch to a narrowband BWP in response to the expiration of the timer. In some cases, UE 215 may deactivate an activated secondary cell without explicit signaling by using a timer (e.g., secondary cell deactivation timer). The timer may include a threshold amount of time (in radio frames or slots) for which UE 215 has not received any data from the secondary cell (e.g., base station 210). In some case, after the timer has expired UE 215 may transition to a default BWP. For example, UE 215 may switch to a zero-BWP based on the expiration of the timer associated with a secondary cell. After switching to the zero-BWP, UE 215 may switch a received to a low power mode. By providing a default BWP that may be a zero-BWP or a narrowband BWP, UE 215 may reduce power consumption.

Figure 4:
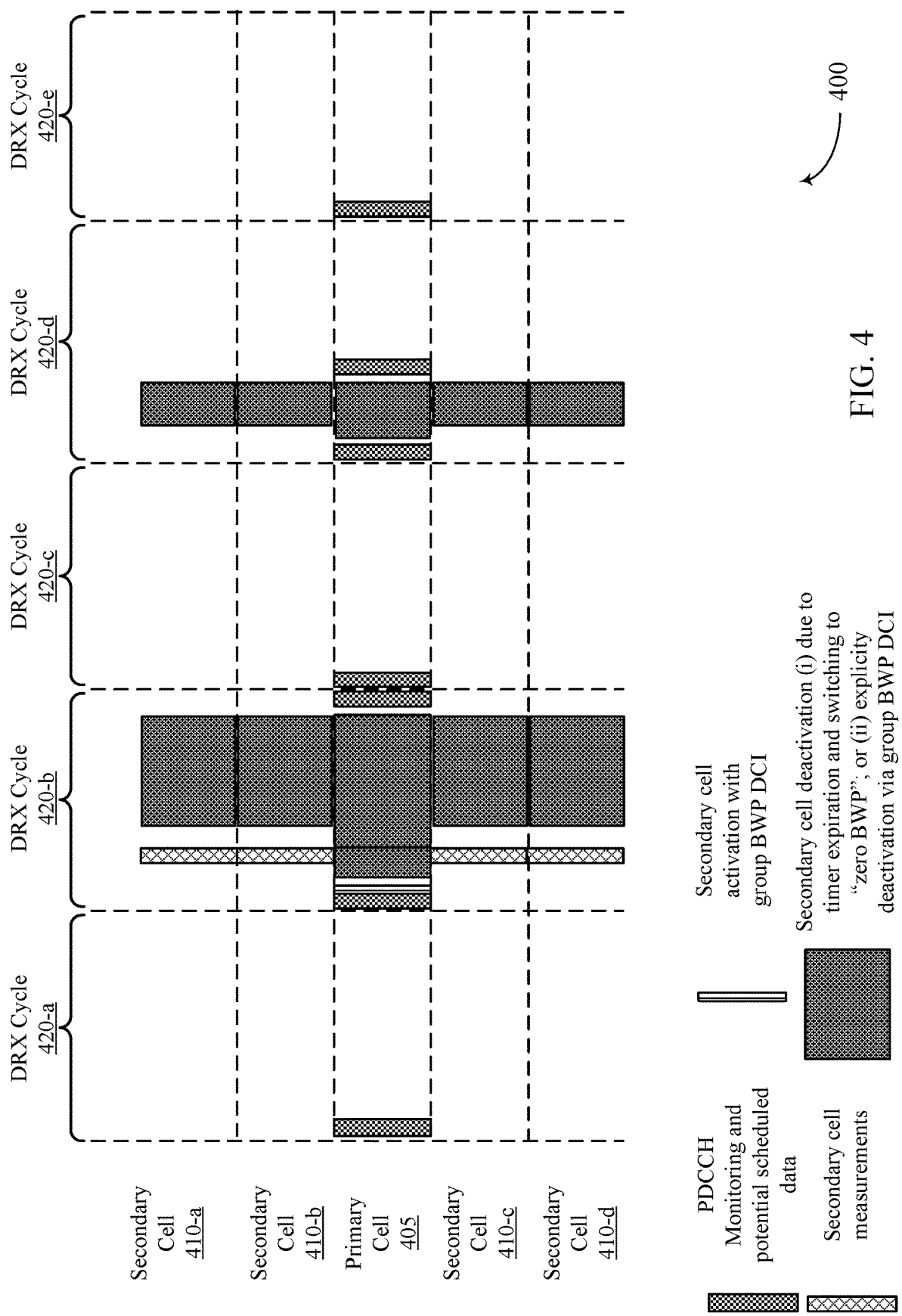
FIG. 4 illustrates an example of a BWP signaling that supports secondary cell activation and deactivation enhancements in new radio in accordance with aspects of the present disclosure.

FIG. 4 illustrates an example of a BWP signaling 400 that supports secondary cell activation and deactivation enhancements in new radio in accordance with aspects of the present disclosure. In some examples, BWP signaling 400 may implement aspects of system 100 and 200. The BWP signaling 400 may include base station 205, base station 210, and UE 215, described with reference to FIG. 2. The BWP signaling 400 may be associated with a radio access technology such as a next generation 5G or millimeter wave (mmW) new radio system, although techniques described herein may be applied to any radio access technology (e.g., Long-Term Evolution (LTE), LTE-advanced (LTE-A)) and to systems that may concurrently use two or more different radio access technologies (e.g., next generation 5G mmW new radio and LTE).

In some examples of wireless communication systems such as LTE, secondary cell activation and deactivation may be signaled using MAC CE. However, communicating the secondary cell activation and deactivation using MAC CE may have a latency that may adversely affect an overall efficiency of the system. In conventional systems, secondary cell activation and deactivation may not be dynamically signaled. Instead, it would be based on UE's near-term traffic loading and/or base station's load-balancing requirement across carriers.

In some cases, BWP signaling may be associated with connected mode discontinuous reception (C-DRX) for a UE. The C-DRX may provide reduced power consumption for the UE. In some examples, BWP signaling may include a number of DRX cycles. Each DRX cycle may span 320 milliseconds (ms). A UE configured with C-DRX may also be associated with an inactivity timer. The inactivity timer may have a threshold duration of 100 ms to 200 ms. In some cases, C-DRX operation may be common across component carriers. For example, if a DRX state is in an ON duration, then all component carriers may be undergoing the ON duration collectively. Based on DoU profiling results, even with C-DRX enabled, a UE may consume significant amount of power monitoring PDCCH without decoding any grant. In addition, with one or more secondary cells being activated, the power consumption for a UE may be increased by a multiple because the one or more secondary cells all require PDCCH monitoring. In some cases, to reduce power consumption associated with PDCCH monitoring, cross-carrier scheduling may be used, so that PDCCH monitoring is performed only on a primary cell. While this may decrease power consumption for a UE, it does introduce other problems. For example, when the number of secondary cells is large, the burden on the primary cell downlink control capacity could be too much.

In an example, a UE may be configured and activated with several secondary cells along with a primary cell. The UE may undergo C-DRX. Initially, the secondary cells may be activated with a first active BWP. When an amount of traffic becomes low, to avoid spending significant amount of time and energy monitoring PDCCH on all activated secondary cells and the primary cell, the secondary cells may be switched to a dormant state (e.g., a partially activated state) for power saving. When the amount of traffic is large enough again, the secondary cells may be switched out of the dormant state onto the preconfigured first active BWP. Traffic may be transferred across all activated, non-dormant secondary cells. A switching from a full activated state to a dormant state for the secondary cells may occur during a DRX cycle. Secondary cell dormancy may provide reduced power consumption for the UE. For instance, a UE may realize that ⅓ of power saving can be attained by monitoring PDCCH only on a primary cell compared to all cells for a UE operating with eight mmW carriers.

Improved techniques for secondary cell activation and deactivation as described herein may reduce power consumption for a UE. In some cases, secondary cell dormancy based on BWP signaling 400 (i.e., BWP DCI signaling) may realize this reduced power consumption for UE 215. The BWP signaling 400 may illustrate an example including a primary cell 405 and four secondary cells 410 (i.e., secondary cell 410-a, secondary cell 410-b, secondary cell 410-c, and secondary cell 410-d). In some examples, the secondary cells 410 and associated BWP may have been configured previously via RRC signaling. In the first DRX cycle 420-a, only the primary cell 405 may be monitored during an ON duration of the first DRX cycle 420-a by UE 215. In this case, no grant may be decoded by UE 215.

In the second DRX cycle 420-b, base station 205 (e.g., gNB) may activate one or more or all of the secondary cells 410 via a group BWP DCI for BWP activation. During the second DRX cycle 420-b secondary cell measurement and feedback may be performed by UE 215. Afterwards, data transmission can be scheduled on the secondary cells 410. When the traffic burst has tapered off, the secondary cells can be quickly deactivated either by a group BWP DCI or a timer expiration. In the third DRX cycle 420-c and the fifth DRX cycle 420-e, no grant was decoded by UE 215 and only a PDCCH of the primary cell 405 is monitored by UE 215. In the fourth DRX cycle 420-d, traffic may be scheduled and the secondary cells may be activated and deactivated to handle the burst. In some cases, if the secondary cells 410 are not deactivated near the end of the second DRX cycle 420-b, and are kept activated through the fourth DRX cycle 420-d, UE 215 would monitor the PDCCH of all secondary cells w in the third DRX cycle 420-c, draining power unnecessarily.

Figure 5:
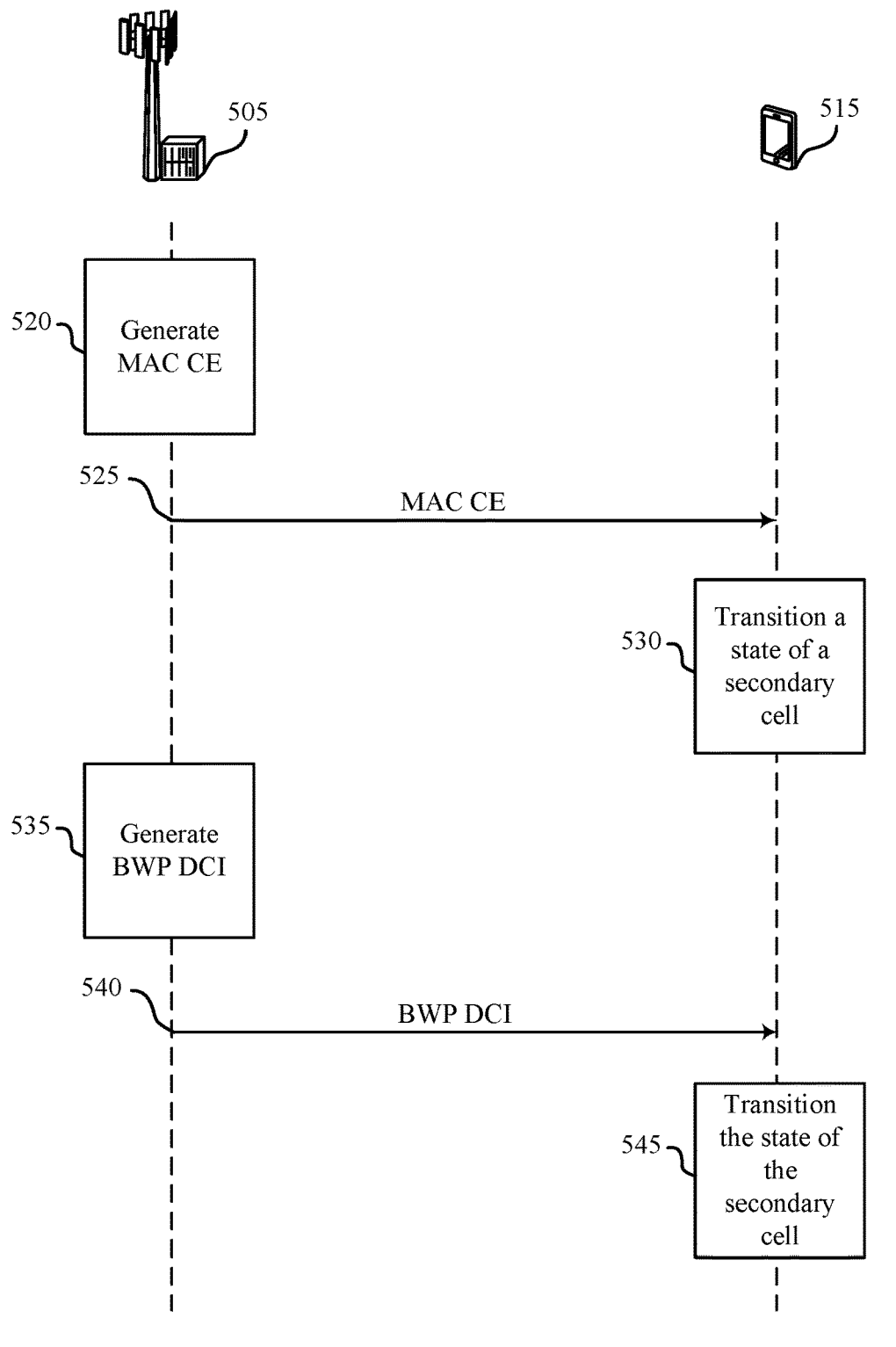
FIG. 5 illustrates an example of a process flow that supports secondary cell activation and deactivation enhancements in new radio in accordance with aspects of the present disclosure.

FIG. 5 illustrates an example of a process flow 500 that supports secondary cell activation and deactivation enhancements in new radio in accordance with various aspects of the present disclosure. In some examples, process flow 500 may implement aspects of system 100 and 200. Base station 505 and UE 515 may be examples of the corresponding devices described with reference to FIGS. 1 and 2.

In the following description of the process flow 500, the operations between the base station 505 and UE 515 may be transmitted in a different order than the exemplary order shown, or the operations performed by the base station 505 and UE 515 may be performed in different orders or at different times. Certain operations may also be left out of the process flow 500, or other operations may be added to the process flow 500. In some examples, process flow 500 may commence with base station 505 establishing a connection with UE 515 (e.g., performing a RRC procedure with each).

At 520, base station 505 may generate a MAC CE. The MAC CE may include an indication for UE 515 to switch a state of a secondary cell as described with reference to FIGS. 2 and 3. At 525, base station 505 may transmit the MAC CE to UE 515. At 530, UE 515 may transition a state of a secondary cell. For example, UE 515 may transition a state of a secondary cell from deactivated to a dormant state based on receiving the MAC CE from base station 505.

At 535, base station 505 may generate a BWP DCI. The BWP DCI may include in addition to, an indication for UE 515 to switch the state of a secondary cell, a BWP ID. The indication may be explicit such as having designated bits in the DCI to indicate how the state of the secondary cell should switch. The indication may alternatively be implicit, such that the state of secondary cells may be inferred from the active BWP status of the primary cell. For example, the secondary cell may switch from the activated state to a dormant state when BWP indication for the primary cell indicates to switch from a wideband BWP to the narrowband or "power saving" BWP. At 540, base station 505 may transmit the BWP DCI to UE 515. At 545, UE 515 may transition the state of the secondary cell. For example, UE 515 may transition the secondary cell from a dormant state to fully activated state based on receiving the BWP DCI from base station 505. By using MAC CE and BWP DCI to signal activation or deactivation of a secondary cell, may reduce power consumption of UE 515 and reduce latency in a wireless communication system. In some examples, to instruct UE 515 to change states of a secondary cell from fully activated to partially activated state (or also referred to as the dormant state), and fully deactivated, base station 505 may cross cell BWP DCI.

Figure 6:
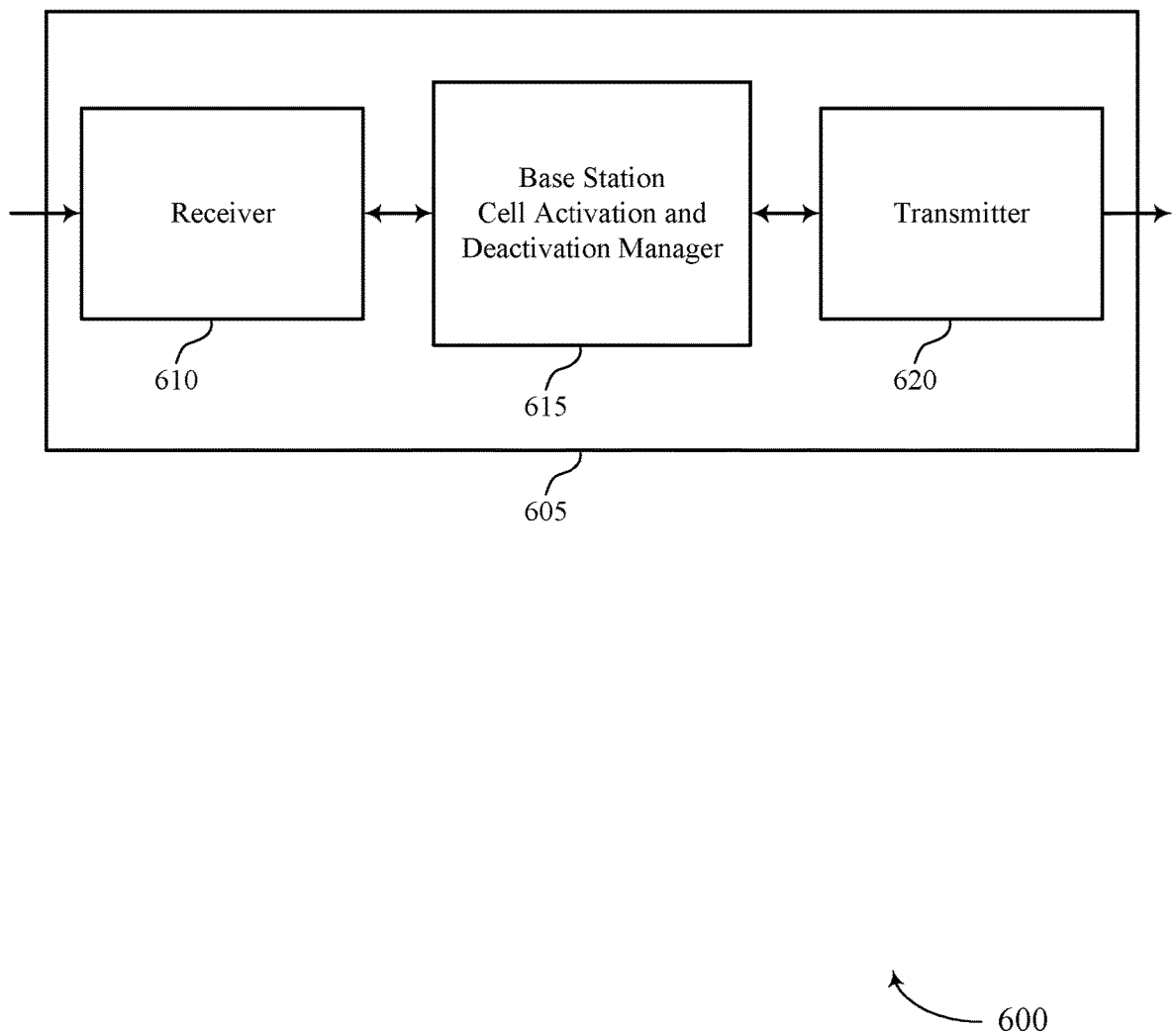
FIGS. 6 through 8 show block diagrams of a device that supports secondary cell activation and deactivation enhancements in new radio in accordance with aspects of the present disclosure.

FIG. 6 shows a block diagram 600 of a wireless device 605 that supports secondary cell activation and deactivation enhancements in new radio in accordance with aspects of the present disclosure. Wireless device 605 may be an example of aspects of a base station 105 as described herein. Wireless device 605 may include receiver 610, base station cell activation and deactivation manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to secondary cell activation and deactivation enhancements in new radio, etc.). Information may be passed on to other components of the device. The receiver 610 may be an example of aspects of the transceiver 935 described with reference to FIG. 9. The receiver 610 may utilize a single antenna or a set of antennas.

Base station cell activation and deactivation manager 615 and/or at least some of its various sub-components may be implemented in hardware, software executed by a processor, firmware, or any combination thereof. If implemented in software executed by a processor, the functions of the base station cell activation and deactivation manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station cell activation and deactivation manager 615 and/or at least some of its various sub-components may be physically located at various positions, including being distributed such that portions of functions are implemented at different physical locations by one or more physical devices. In some examples, base station cell activation and deactivation manager 615 and/or at least some of its various sub-components may be a separate and distinct component in accordance with various aspects of the present disclosure. In other examples, base station cell activation and deactivation manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station cell activation and deactivation manager 615 may transmit a first signal instructing a UE to transition a state of a secondary cell associated with the UE, determine an allocation of resources for the UE to communicate with the secondary cell, and transmit a second signal including an indication of an active BWP used for the allocation of resources based on the determining, the active BWP and the first signal indicating the transition of the state of the secondary cell.

The base station cell activation and deactivation manager 615 may also configure at least one bit of a field in a BWP DCI to indicate selections for activated or deactivated states for a secondary cell and a BWP selection for the base station and transmit the BWP DCI to a UE based on the configuring. The base station cell activation and deactivation manager 615 may also configure a bitmap in a BWP DCI, the bitmap indicating a state associated with each secondary cell of a group of secondary cells and transmit the BWP DCI to a UE.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
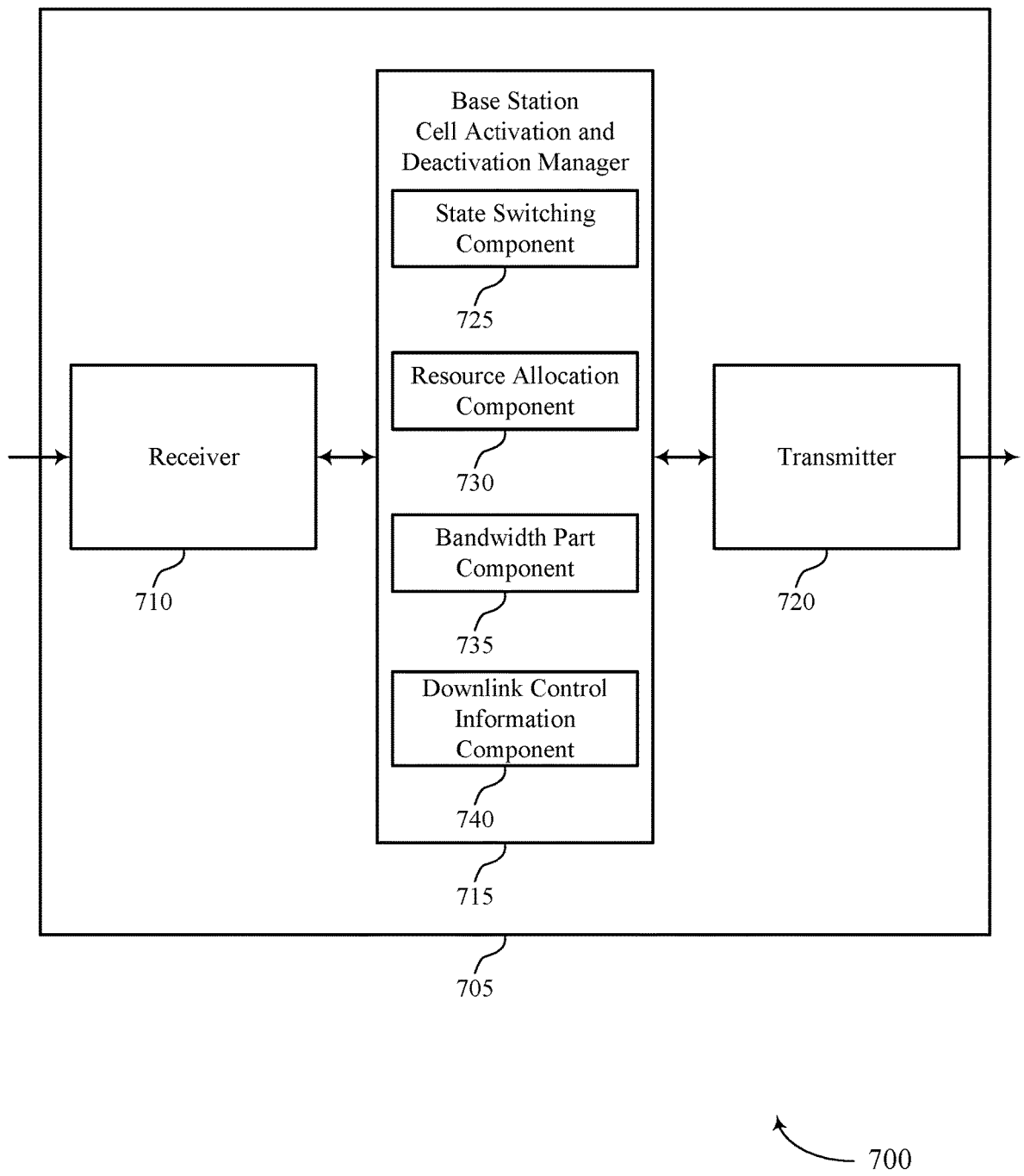

FIG. 7 shows a block diagram 700 of a wireless device 705 that supports secondary cell activation and deactivation enhancements in new radio in accordance with aspects of the present disclosure. Wireless device 705 may be an example of aspects of a wireless device 605 or a base station 105 as described with reference to FIG. 6. Wireless device 705 may include receiver 710, base station cell activation and deactivation manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to secondary cell activation and deactivation enhancements in new radio, etc.). Information may be passed on to other components of the device. The receiver 710 may be an example of aspects of the transceiver 935 described with reference to FIG. 9. The receiver 710 may utilize a single antenna or a set of antennas.

Base station cell activation and deactivation manager 715 may be an example of aspects of the base station cell activation and deactivation manager 615 described with reference to FIG. 6. Base station cell activation and deactivation manager 715 may also include state switching component 725, resource allocation component 730, bandwidth part component 735, and downlink control information component 740.

State switching component 725 may transmit a first signal instructing a UE to transition a state of a secondary cell associated with the UE. State switching component 725 may configure at least one bit of a bitmap to indicate a selection of a primary cell or a state of a group of secondary cells. State switching component 725 may configure the secondary cell to be in a full activated state based on the transmitted first signal and the active BWP being a non-zero BWP. State switching component 725 may configure the secondary cell to be in a partially activated state based on the transmitted first signal and the active BWP being a zero BWP. State switching component 725 may configure the secondary cell to be in a full deactivated state based on the transmitted first signal. State switching component 725 may configure the secondary cell to be in a full deactivated state based on a deactivation timer expiring. State switching component 725 may configure the secondary cell to switch to a default BWP comprising a zero-BWP based at least in part on a BWP timer expiring. In some examples, the active BWP is deactivated based at least in part on the secondary cell being in a full deactivated state State switching component 725 may configure the primary cell to switch to a default BWP based on an expiration of a timer. State switching component 725 may configure a subset of or all secondary cells of the group to switch from a fully activated state to a partially activated state based on an expiration of a timer. State switching component 725 may configure the at least one secondary cell to be in a full activated state based on a transmitted MAC CE and the active BWP being a non-zero BWP. State switching component 725 may configure the at least one secondary cell to be in a partially activated state based on the transmitted MAC CE and the active BWP being a zero BWP. State switching component 725 may configure one or more secondary cells to switch from the partially activated state to a full activated state based at least in part on a BWP switching DCI transmitted on a primary cell without a grant, wherein the BWP switching DCI includes BWP activation control information for the one or more secondary cells associated with the UE. State switching component 725 may configure the secondary cell to switch from the partially activated state to a full activated state based at least in part on a BWP switching DCI transmitted on a primary cell, wherein the BWP switching DCI includes at least a CIF State switching component 725 may configure the at least one secondary cell to be in a full deactivated state based on the transmitted MAC CE, and configure a MAC CE to indicate the group of secondary cells based on the BWP DCI. In some cases, the state includes a fully activated state, a partially activated and deactivated state, or a fully deactivated state. In some cases, the first signal includes a MAC CE and the second signal includes BWP DCI. In some cases, the partially activated state is associated with a default BWP including a zero-BWP. In some cases, the default BWP is configured to be a non-zero BWP.

Resource allocation component 730 may determine an allocation of resources for the UE to communicate with the secondary cell and determine an allocation of resources for the UE to communicate with the at least one secondary cell. Bandwidth part component 735 may transmit a second signal including an indication of the active BWP used for the allocation of resources based on the determining, the active BWP and the first signal indicating the transition of the state of the secondary cell. Bandwidth part component 735 may configure at least one bit of a field in a BWP DCI to indicate selections for activated or deactivated states for a secondary cell and a BWP selection for the base station. Bandwidth part component 735 may configure a bitmap in a BWP DCI, the bitmap indicating a state associated with each secondary cell of a group of secondary cells, transmit the BWP DCI to a UE, and transmit an indication of an active BWP used for the allocation of resources in the BWP DCI based on the determining. Downlink control information component 740 may transmit the BWP DCI to a UE based on the configuring.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
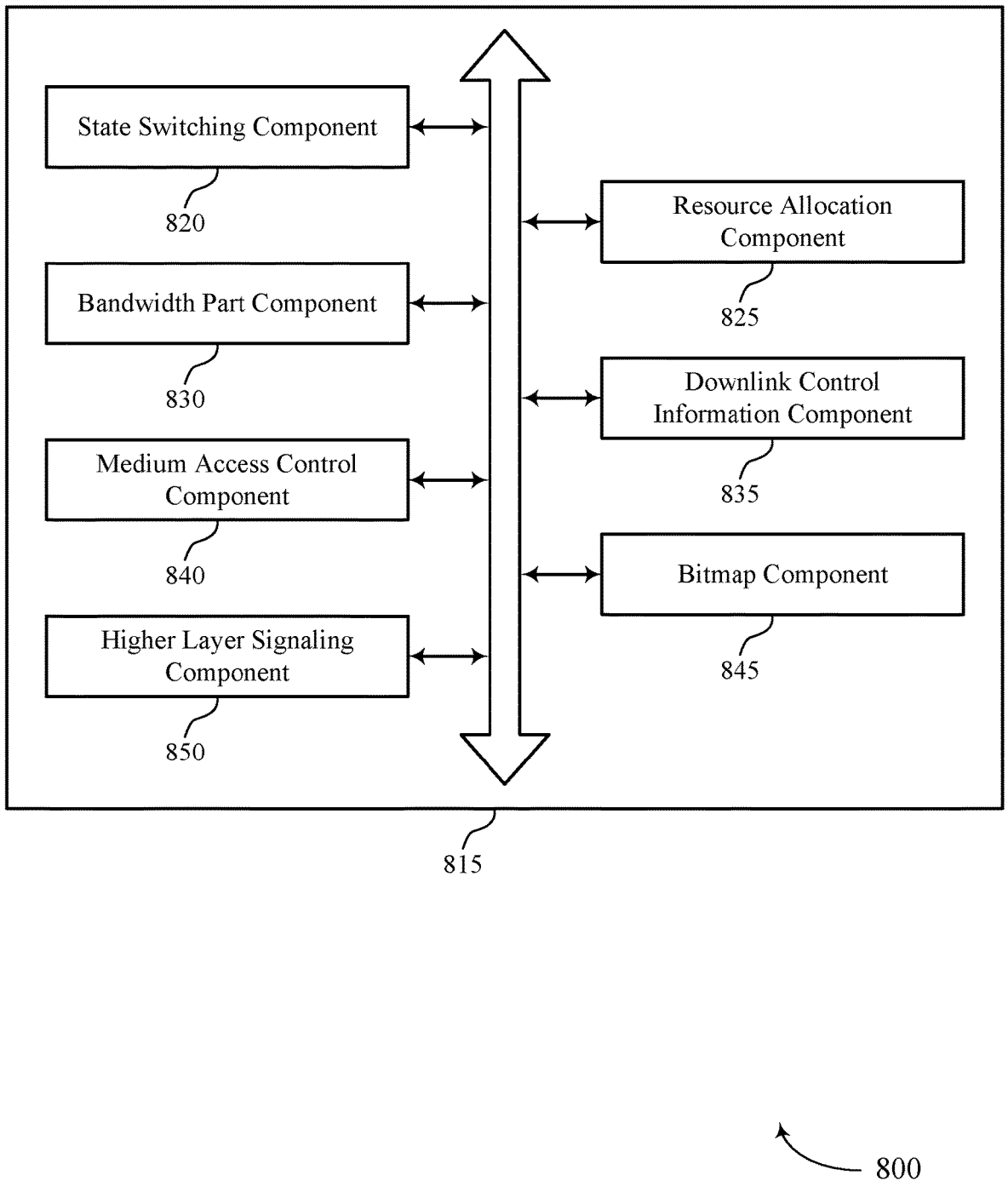

FIG. 8 shows a block diagram 800 of a base station cell activation and deactivation manager 815 that supports secondary cell activation and deactivation enhancements in new radio in accordance with aspects of the present disclosure. The base station cell activation and deactivation manager 815 may be an example of aspects of a base station cell activation and deactivation manager 615, a base station cell activation and deactivation manager 715, or a base station cell activation and deactivation manager 915 described with reference to FIGS. 6, 7, and 9. The base station cell activation and deactivation manager 815 may include state switching component 820, resource allocation component 825, bandwidth part component 830, downlink control information component 835, medium access control component 840, bitmap component 845, and higher layer signaling component 850. Each of these modules may communicate, directly or indirectly, with one another (e.g., via one or more buses).

State switching component 820 may transmit a first signal instructing a UE to transition a state of a secondary cell associated with the UE. State switching component 820 may configure at least one bit of a bitmap to indicate a selection of a primary cell or a state of a group of secondary cells. State switching component 820 may configure the secondary cell to be in a full activated state based on the transmitted first signal and an active BWP being a non-zero BWP. State switching component 820 may configure the secondary cell to be in a partially activated state based on the transmitted first signal and the active BWP being a zero BWP.

State switching component 820 may configure one or more secondary cells to switch from the partially activated state to a full activated state based at least in part on a BWP switching DCI transmitted on a primary cell without a grant, wherein the BWP switching DCI includes BWP activation control information for the one or more secondary cells associated with the UE. State switching component 820 may configure the secondary cell to switch from the partially activated state to a full activated state based at least in part on a BWP switching DCI transmitted on a primary cell, wherein the BWP switching DCI includes at least a CIF. State switching component 820 may configure the secondary cell to be in a full deactivated state based on the transmitted first signal. State switching component 820 may configure the secondary cell to be in a full deactivated state based on a deactivation timer expiring. State switching component 820 may configure the secondary cell to switch to a default BWP comprising a zero-BWP based at least in part on a BWP timer expiring. In some examples, the active BWP is deactivated based at least in part on the secondary cell being in a full deactivated state.

State switching component 820 may configure the primary cell to switch to a default BWP based on an expiration of a timer. State switching component 820 may configure a subset of or all secondary cells of the group to switch from a fully activated state to a partially activated state based on an expiration of a timer. State switching component 820 may configure the at least one secondary cell to be in a full activated state based on the transmitted MAC CE and the active BWP being a non-zero BWP. State switching component 820 may configure the at least one secondary cell to be in a partially activated state based on the transmitted MAC CE and the active BWP being a zero BWP. State switching component 820 may configure the at least one secondary cell to switch from the partially activated state to a fully activated state based at least in part on a BWP switching DCI transmitted on a primary cell without a grant. In some examples, switching from the partially activated state to the full activated state is further based at least in part on at least one bit of the bitmap. In some examples, at least one bit of the bitmap includes a secondary cell indicator. State switching component 820 may configure at least one bit of the bitmap based at least in part on a zero resource allocation.

State switching component 820 may configure the at least one secondary cell to be in a full deactivated state based on the transmitted MAC CE. State switching component 820 may configure a MAC CE to indicate a group of secondary cells based on the BWP DCI. The BWP DCI of a primary cell associated with the base station carries BWP activation control information for the secondary cell. In some cases, the state includes a fully activated state, a partially activated and deactivated state, or a fully deactivated state. In some cases, the first signal includes a MAC CE and the second signal includes BWP DCI. In some cases, the partially activated state is associated with a default BWP including a zero-BWP. In some cases, the default BWP is configured to be a non-zero BWP.

Resource allocation component 825 may determine an allocation of resources for the UE to communicate with the secondary cell and determine an allocation of resources for the UE to communicate with the at least one secondary cell.

Bandwidth part component 830 may transmit a second signal including an indication of the active BWP used for the allocation of resources based on the determining. The active BWP and the first signal indicating the transition of the state of the secondary cell. Bandwidth part component 830 may configure at least one bit of a field in the BWP DCI to indicate selections for activated or deactivated states for a secondary cell and a BWP selection for the base station. Bandwidth part component 830 may configure the bitmap in the BWP DCI, the bitmap indicating a state associated with each secondary cell of a group of secondary cells. Bandwidth part component 830 may transmit the BWP DCI to a UE, and transmit an indication of an active BWP used for the allocation of resources in the BWP DCI based on the determining.

Downlink control information component 835 may transmit the BWP DCI to the UE based on the configuring. Medium access control component 840 may configure a MAC CE to indicate a group of secondary cells based on the BWP DCI and transmit a MAC CE instructing the UE to transition a state of at least one secondary cell of the group of secondary cells. Bitmap component 845 may identify a number of bits associated with the bitmap. Bitmap component 845 may configure at least one bit of the bitmap to indicate a target BWP ID based on the number of bits, and configure at least a remaining number of bits for control information indicating the state associated with each secondary cell of the group of secondary cells. Higher layer signaling component 850 may transmit the state associated with each secondary cell of the group of secondary cells using higher layer signaling. In some cases, the higher layer signaling includes RRC signaling or MAC CE signaling during a secondary cell configuration procedure.

Figure 9:
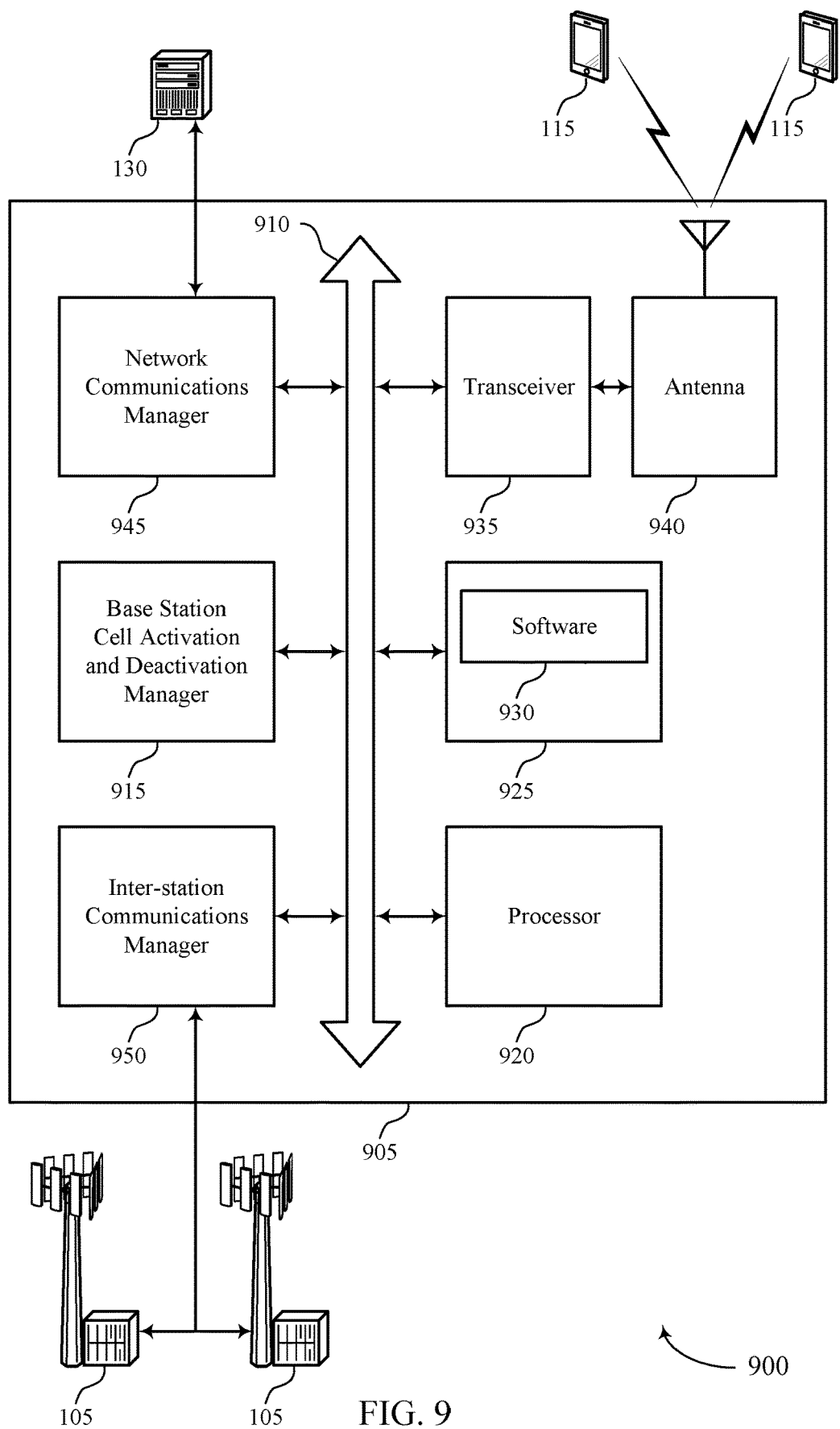
FIG. 9 illustrates a block diagram of a system including a base station that supports secondary cell activation and deactivation enhancements in new radio in accordance with aspects of the present disclosure.

FIG. 9 shows a diagram of a system 900 including a device 905 that supports secondary cell activation and deactivation enhancements in new radio in accordance with aspects of the present disclosure. Device 905 may be an example of or include the components of wireless device 605, wireless device 705, or a base station 105 as described above, e.g., with reference to FIGS. 6 and 7. Device 905 may include components for bi-directional voice and data communications including components for transmitting and receiving communications, including base station cell activation and deactivation manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting secondary cell activation and deactivation enhancements in new radio).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support secondary cell activation and deactivation enhancements in new radio. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
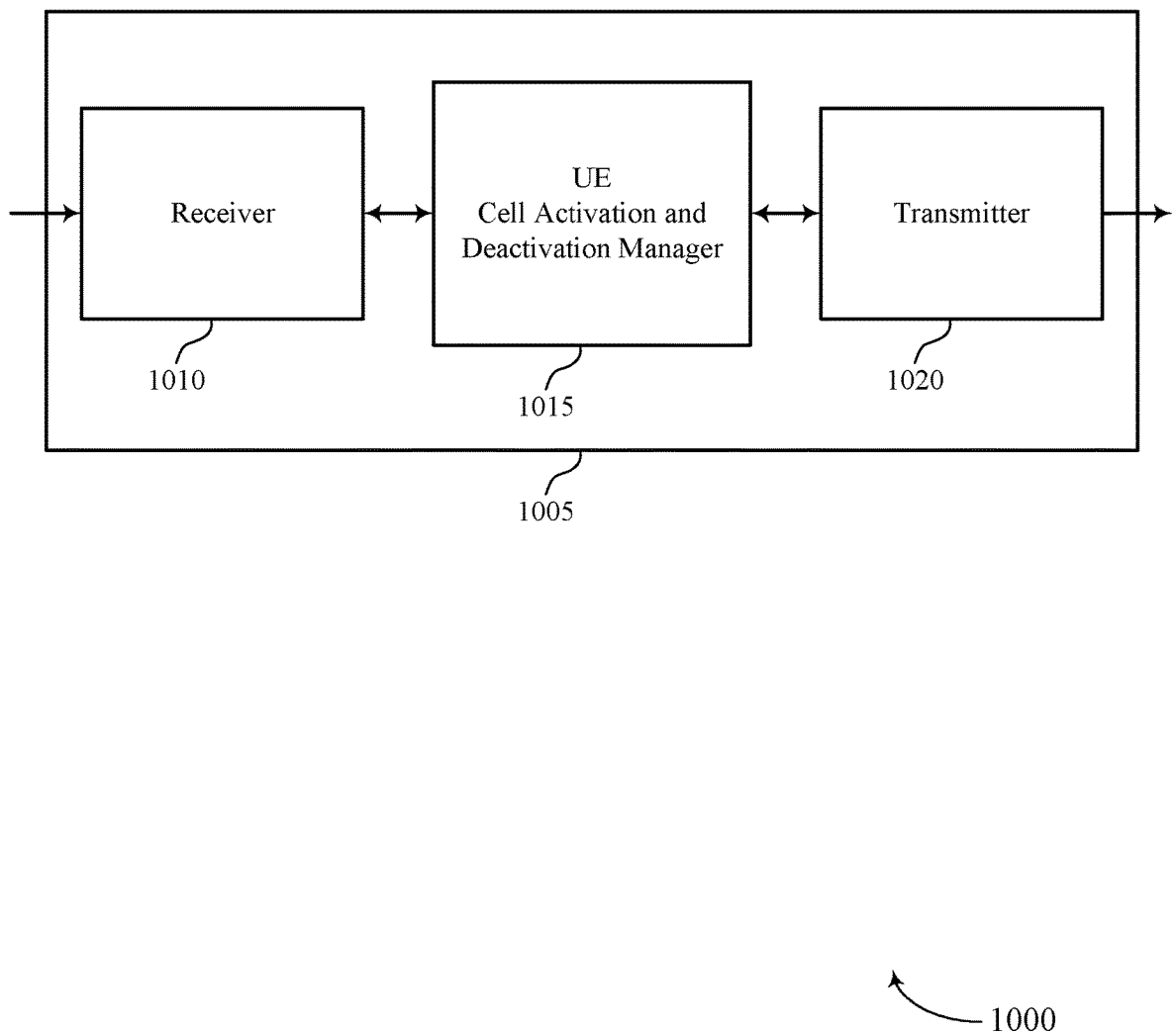
FIGS. 10 through 12 show block diagrams of a device that supports secondary cell activation and deactivation enhancements in new radio in accordance with aspects of the present disclosure.

FIG. 10 shows a block diagram 1000 of a wireless device 1005 that supports secondary cell activation and deactivation enhancements in new radio in accordance with aspects of the present disclosure. Wireless device 1005 may be an example of aspects of a UE 115 as described herein. Wireless device 1005 may include receiver 1010, UE cell activation and deactivation manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to secondary cell activation and deactivation enhancements in new radio, etc.). Information may be passed on to other components of the device. The receiver 1010 may be an example of aspects of the transceiver 1335 described with reference to FIG. 13. The receiver 1010 may utilize a single antenna or a set of antennas.

UE cell activation and deactivation manager 1015 and/or at least some of its various sub-components may be implemented in hardware, software executed by a processor, firmware, or any combination thereof. If implemented in software executed by a processor, the functions of the UE cell activation and deactivation manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE cell activation and deactivation manager 1015 and/or at least some of its various sub-components may be physically located at various positions, including being distributed such that portions of functions are implemented at different physical locations by one or more physical devices. In some examples, UE cell activation and deactivation manager 1015 and/or at least some of its various sub-components may be a separate and distinct component in accordance with various aspects of the present disclosure. In other examples, UE cell activation and deactivation manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE cell activation and deactivation manager 1015 may receive a MAC CE, receive a BWP DCI including an indication of an active BWP used for allocation of resources for the UE to communicate with the secondary cell, and transition a state of a secondary cell based on the MAC CE and the active BWP. The UE cell activation and deactivation manager 1015 may also receive a BWP DCI from a base station and identify a selection of a primary cell or a state of a group of secondary cells based on at least one bit of a field in the BWP DCI.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
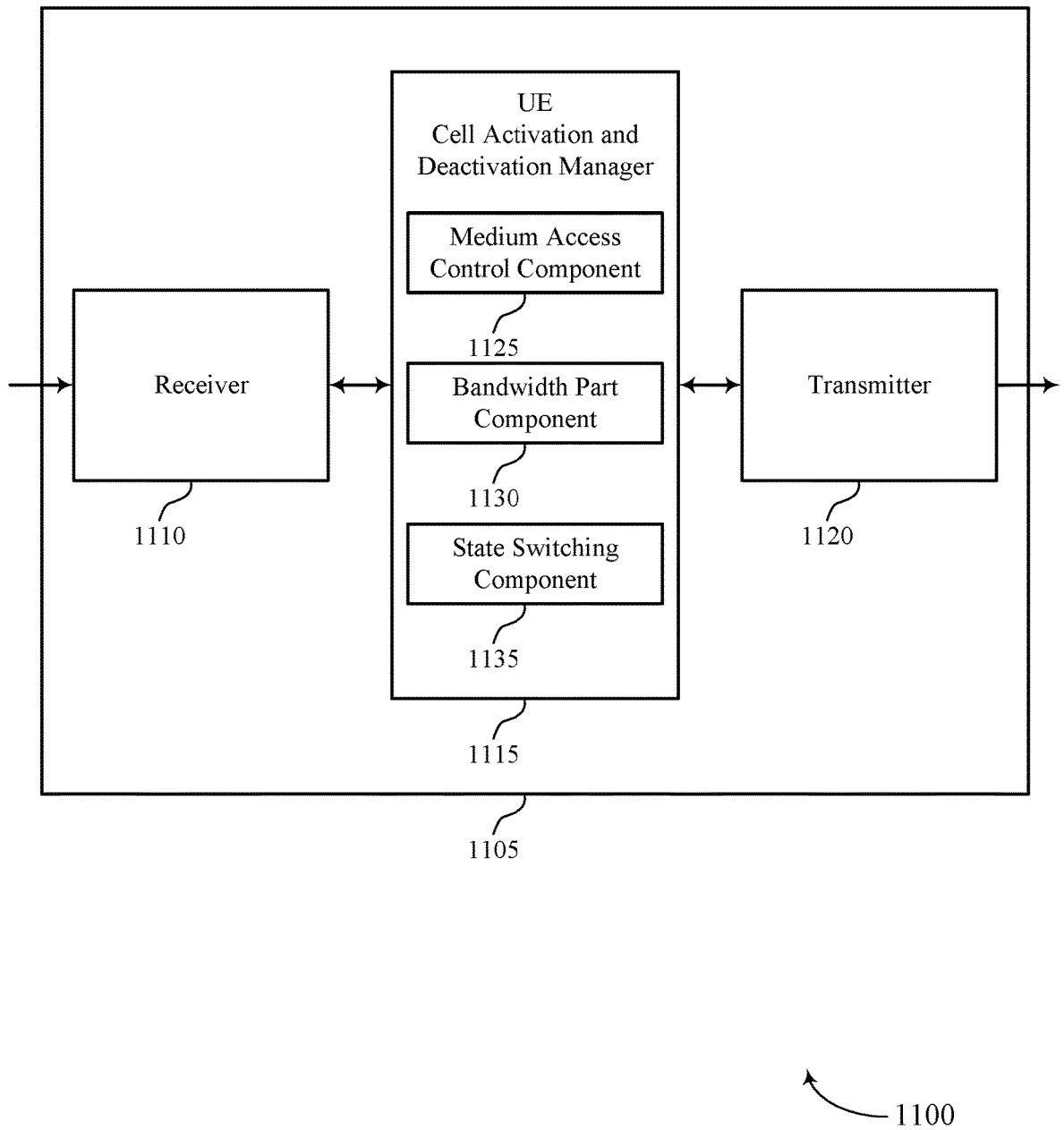

FIG. 11 shows a block diagram 1100 of a wireless device 1105 that supports secondary cell activation and deactivation enhancements in new radio in accordance with aspects of the present disclosure. Wireless device 1105 may be an example of aspects of a wireless device 1005 or a UE 115 as described with reference to FIG. 10. Wireless device 1105 may include receiver 1110, UE cell activation and deactivation manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to secondary cell activation and deactivation enhancements in new radio, etc.). Information may be passed on to other components of the device. The receiver 1110 may be an example of aspects of the transceiver 1335 described with reference to FIG. 13. The receiver 1110 may utilize a single antenna or a set of antennas.

UE cell activation and deactivation manager 1115 may be an example of aspects of the UE cell activation and deactivation manager 1015 described with reference to FIG. 10. UE cell activation and deactivation manager 1115 may also include medium access control component 1125, bandwidth part component 1130, and state switching component 1135.

Medium access control component 1125 may receive a MAC CE. Bandwidth part component 1130 may receive a BWP DCI including an indication of an active BWP used for allocation of resources for the UE to communicate with the secondary cell and receive a BWP DCI from a base station.

State switching component 1135 may transition a state of a secondary cell based on the MAC CE and the active BWP. State switching component 1135 may transition the state of the secondary cell to a full activated state based on the received MAC CE and the active BWP being a non-zero BWP. State switching component 1135 may transition the state of the secondary cell to a partially activated state based on the received MAC CE and the active BWP being a zero BWP. State switching component 1135 may transition the state of the secondary cell to a full deactivated state based on the received MAC CE. State switching component 1135 may transition the state of the secondary cell to a full deactivated state based on a deactivation timer expiring. State switching component 1135 may identify a selection of a primary cell or a state of a group of secondary cells based on at least one bit of a field in the BWP DCI. In some cases, the state includes a fully activated state, a partially activated or deactivate state, or a fully deactivated state.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
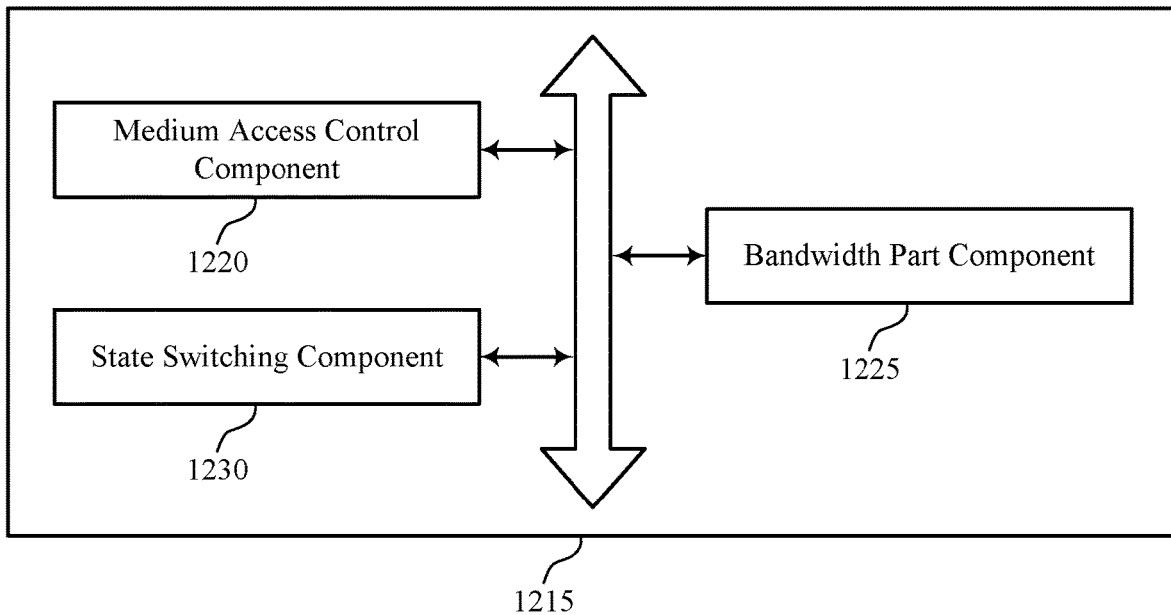

FIG. 12 shows a block diagram 1200 of a UE cell activation and deactivation manager 1215 that supports secondary cell activation and deactivation enhancements in new radio in accordance with aspects of the present disclosure. The UE cell activation and deactivation manager 1215 may be an example of aspects of a UE cell activation and deactivation manager 1215 described with reference to FIGS. 9, 10, and 13. The UE cell activation and deactivation manager 1215 may include medium access control component 1220, bandwidth part component 1225, and state switching component 1230. Each of these modules may communicate, directly or indirectly, with one another (e.g., via one or more buses).

Medium access control component 1220 may receive a MAC CE. Bandwidth part component 1225 may receive a BWP DCI including an indication of an active BWP used for allocation of resources for the UE to communicate with the secondary cell and receive a BWP DCI from a base station. State switching component 1230 may transition a state of a secondary cell based on the MAC CE and the active BWP. State switching component 1230 may transition the state of the secondary cell to a full activated state based on the received MAC CE and the active BWP being a non-zero BWP. State switching component 1230 may transition the state of the secondary cell to a partially activated state based on the received MAC CE and the active BWP being a zero BWP. State switching component 1230 may transition the state of the secondary cell to a full deactivated state based on the received MAC CE.

State switching component 1230 may transmit a BWP switching DCI on the secondary cell indicating switching to a zero BWP for the secondary cell. In some examples, the BWP switching DCI is transmitted without a grant. State switching component 1230 may transmit a BWP switching DCI on the primary cell indicating switching to a zero BWP for the secondary cell. In some examples, the BWP switching DCI includes at least a CIF. The BWP DCI carries BWP activation control information for the secondary cell.

State switching component 1230 may transition the state of the secondary cell to a full deactivated state based on a deactivation timer expiring. State switching component 1230 may identify a selection of a primary cell or a state of a group of secondary cells based on at least one bit of a field in the BWP DCI. In some cases, the state includes a fully activated state, a partially activated or deactivate state, or a fully deactivated state.

Figure 13:
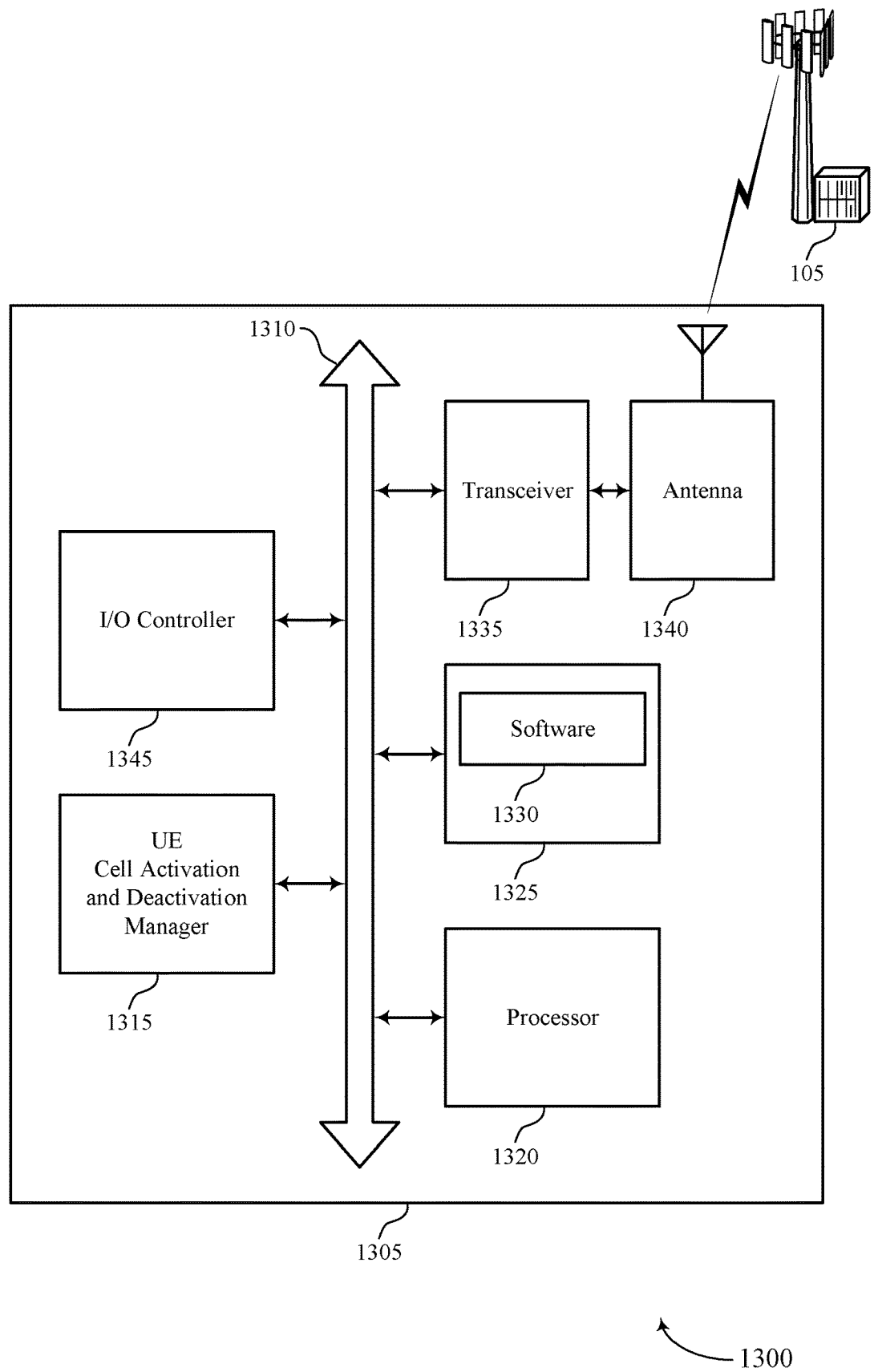
FIG. 13 illustrates a block diagram of a system including a UE that supports secondary cell activation and deactivation enhancements in new radio in accordance with aspects of the present disclosure.

FIG. 13 shows a diagram of a system 1300 including a device 1305 that supports secondary cell activation and deactivation enhancements in new radio in accordance with aspects of the present disclosure. Device 1305 may be an example of or include the components of UE 115 as described above, e.g., with reference to FIG. 1. Device 1305 may include components for bi-directional voice and data communications including components for transmitting and receiving communications, including UE cell activation and deactivation manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting secondary cell activation and deactivation enhancements in new radio).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support secondary cell activation and deactivation enhancements in new radio. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
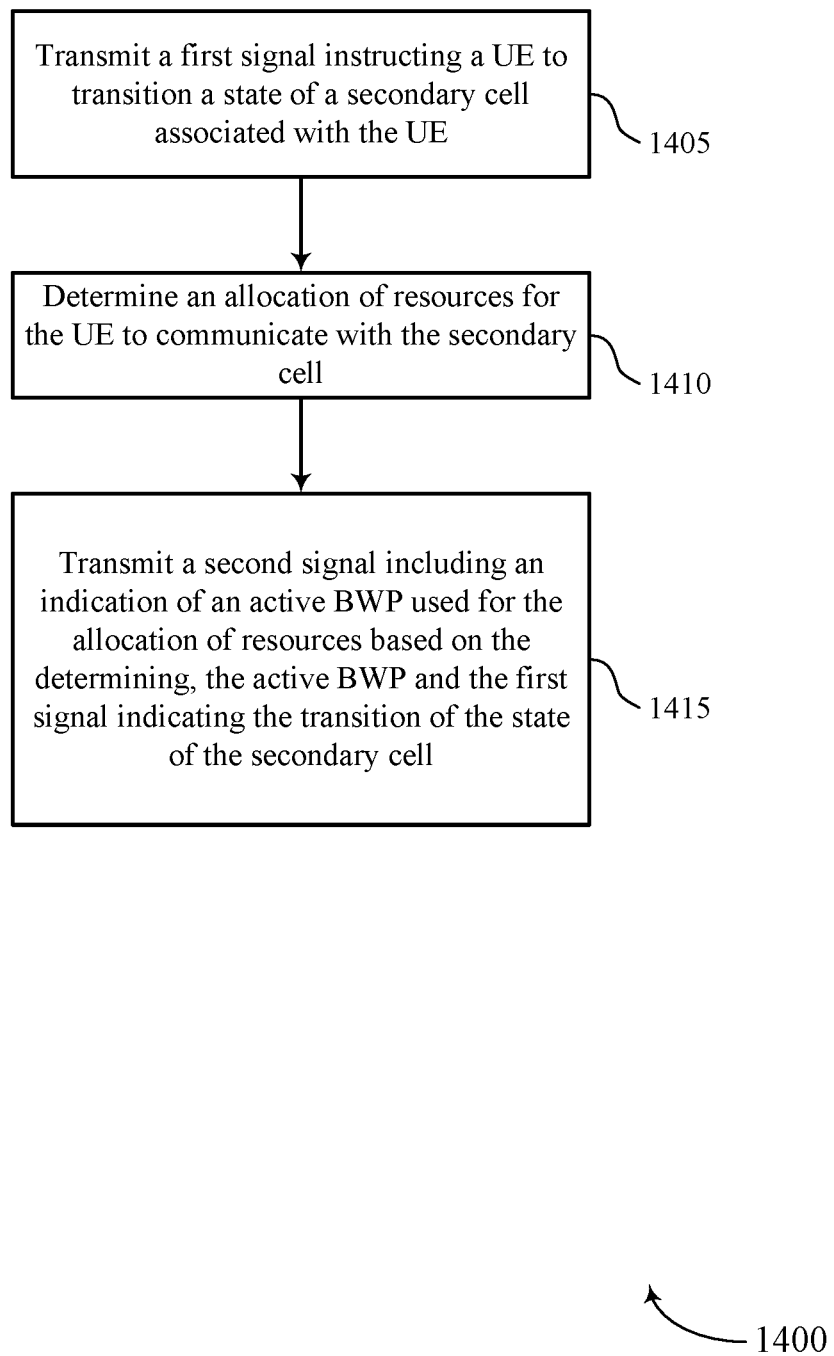
FIGS. 14 through 18 illustrate methods for secondary cell activation and deactivation enhancements in new radio in accordance with aspects of the present disclosure.

FIG. 14 shows a flowchart illustrating a method 1400 for secondary cell activation and deactivation enhancements in new radio in accordance with aspects of the present disclosure. The operations of method 1400 may be implemented by a base station 105 or its components as described herein. For example, the operations of method 1400 may be performed by a base station cell activation and deactivation manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may transmit a first signal instructing a UE to transition a state of a secondary cell associated with the UE. The operations of 1405 may be performed according to the methods described herein. In certain examples, aspects of the operations of 1405 may be performed by a state switching component as described with reference to FIGS. 5 through 8.

At 1410 the base station 105 may determine an allocation of resources for the UE to communicate with the secondary cell. The operations of 1410 may be performed according to the methods described herein. In certain examples, aspects of the operations of 1410 may be performed by a resource allocation component as described with reference to FIGS. 5 through 8.

At 1415 the base station 105 may transmit a second signal including an indication of an active BWP used for the allocation of resources based at least in part on the determining, the active BWP and the first signal indicating the transition of the state of the secondary cell. The operations of 1415 may be performed according to the methods described herein. In certain examples, aspects of the operations of 1415 may be performed by a bandwidth part component as described with reference to FIGS. 5 through 8.

Figure 15:
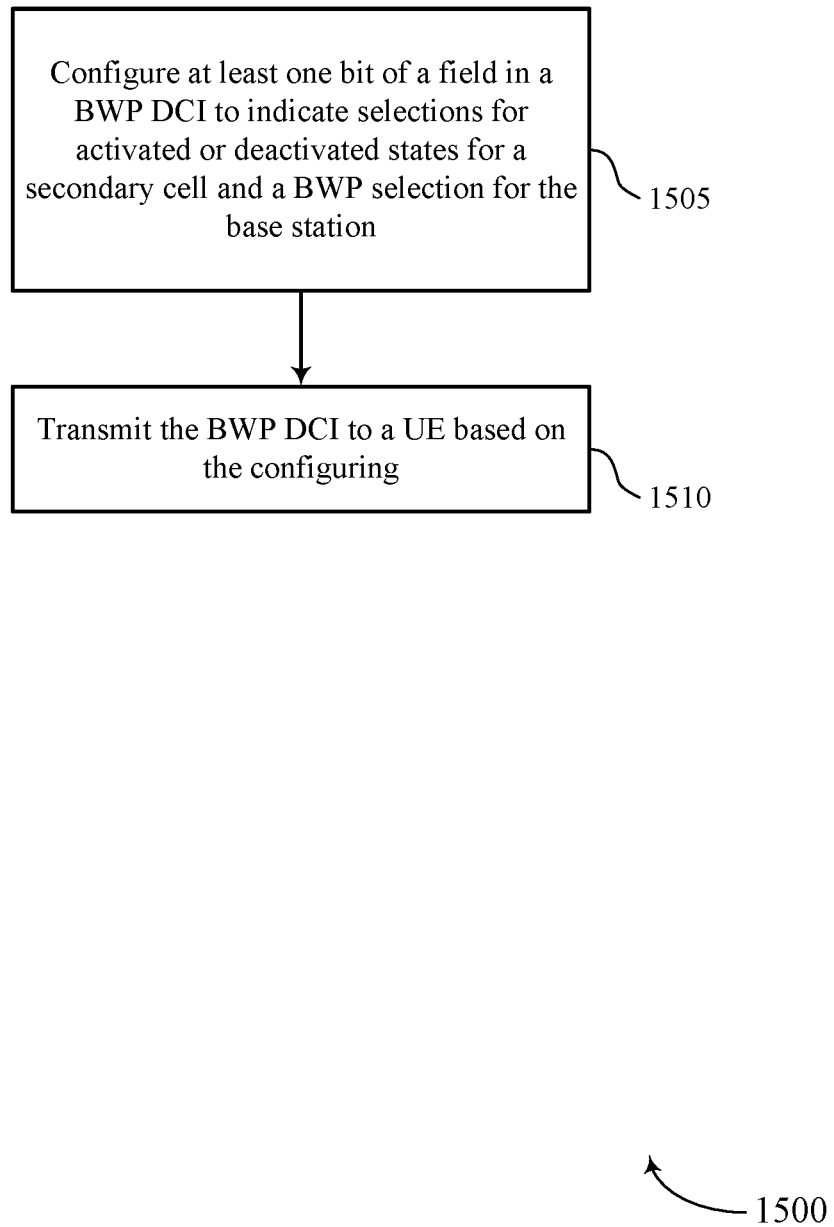

FIG. 15 shows a flowchart illustrating a method 1500 for secondary cell activation and deactivation enhancements in new radio in accordance with aspects of the present disclosure. The operations of method 1500 may be implemented by a base station 105 or its components as described herein. For example, the operations of method 1500 may be performed by a base station cell activation and deactivation manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may configure at least one bit of a field in a BWP DCI to indicate selections for activated or deactivated states for a secondary cell and a BWP selection for the base station. The operations of 1505 may be performed according to the methods described herein. In certain examples, aspects of the operations of 1505 may be performed by a bandwidth part component as described with reference to FIGS. 5 through 8.

At 1510 the base station 105 may transmit the BWP DCI to a UE based at least in part on the configuring. The operations of 1510 may be performed according to the methods described herein. In certain examples, aspects of the operations of 1510 may be performed by a downlink control information component as described with reference to FIGS. 5 through 8.

Figure 16:
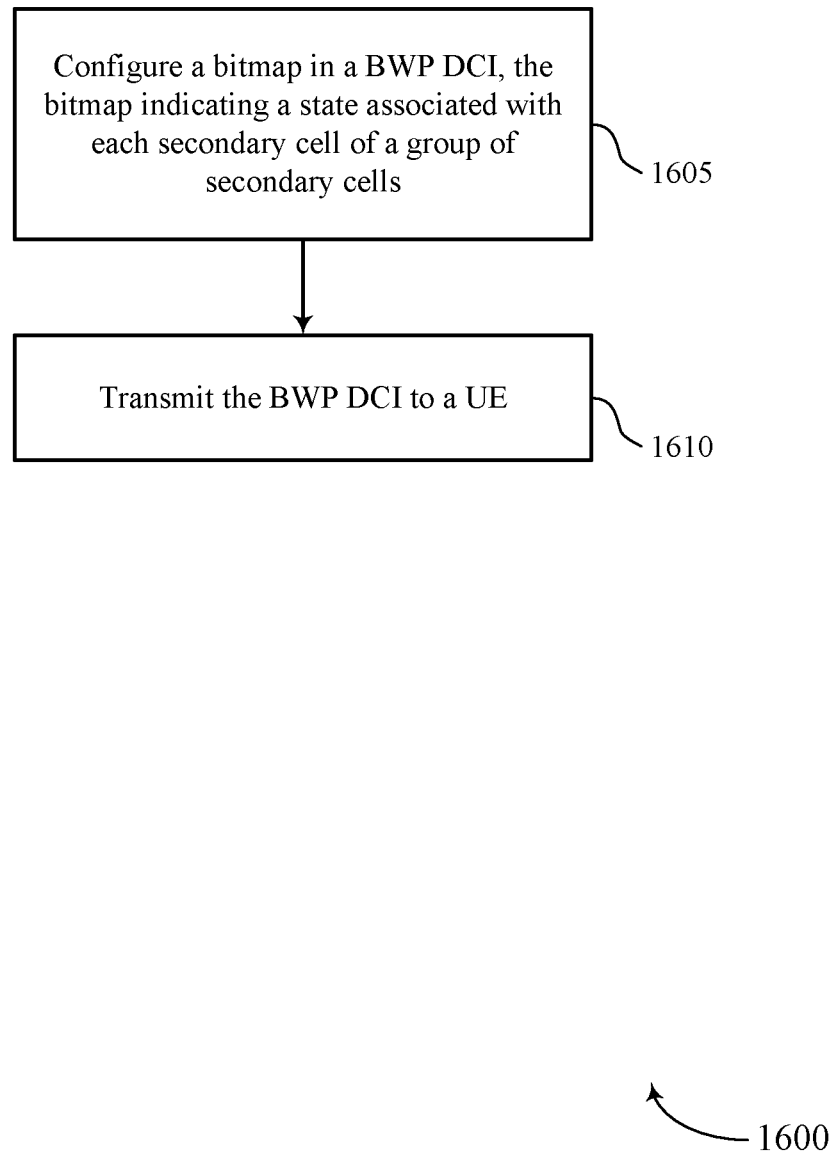

FIG. 16 shows a flowchart illustrating a method 1600 for secondary cell activation and deactivation enhancements in new radio in accordance with aspects of the present disclosure. The operations of method 1600 may be implemented by a base station 105 or its components as described herein. For example, the operations of method 1600 may be performed by a base station cell activation and deactivation manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may configure a bitmap in a BWP DCI, the bitmap indicating a state associated with each secondary cell of a group of secondary cells. The operations of 1605 may be performed according to the methods described herein. In certain examples, aspects of the operations of 1605 may be performed by a bandwidth part component as described with reference to FIGS. 5 through 8.

At 1610 the base station 105 may transmit the BWP DCI to a UE. The operations of 1610 may be performed according to the methods described herein. In certain examples, aspects of the operations of 1610 may be performed by a bandwidth part component as described with reference to FIGS. 5 through 8.

Figure 17:
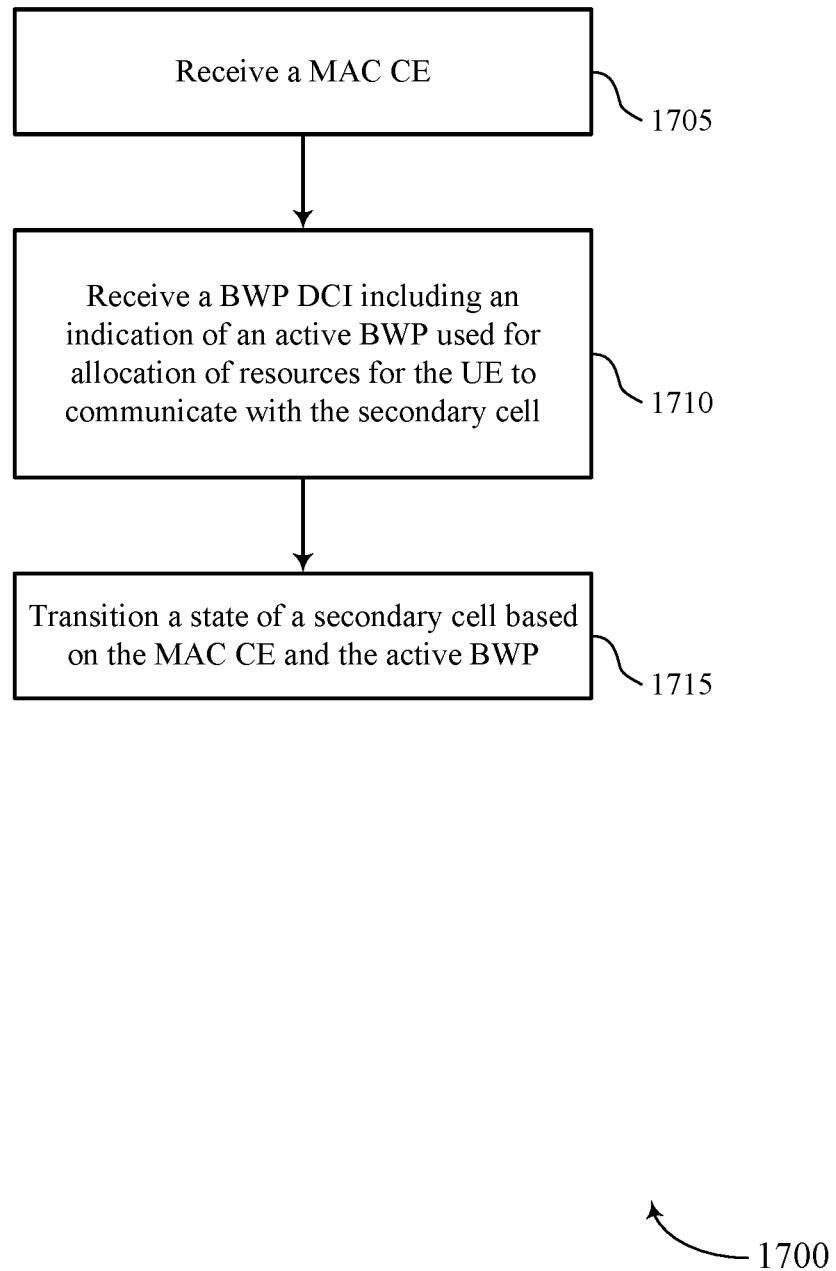

FIG. 17 shows a flowchart illustrating a method 1700 for secondary cell activation and deactivation enhancements in new radio in accordance with aspects of the present disclosure. The operations of method 1700 may be implemented by a UE 115 or its components as described herein. For example, the operations of method 1700 may be performed by a UE cell activation and deactivation manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive a MAC CE. The operations of 1705 may be performed according to the methods described herein. In certain examples, aspects of the operations of 1705 may be performed by a medium access control component as described with reference to FIGS. 9 through 12.

At 1710 the UE 115 may receive a BWP DCI including an indication of an active BWP used for allocation of resources for the UE to communicate with the secondary cell. The operations of 1710 may be performed according to the methods described herein. In certain examples, aspects of the operations of 1710 may be performed by a bandwidth part component as described with reference to FIGS. 9 through 12.

At 1715 the UE 115 may transition e a state of a secondary cell based at least in part on the MAC CE and the active BWP. The operations of 1715 may be performed according to the methods described herein. In certain examples, aspects of the operations of 1715 may be performed by a state switching component as described with reference to FIGS. 9 through 12.

Figure 18:
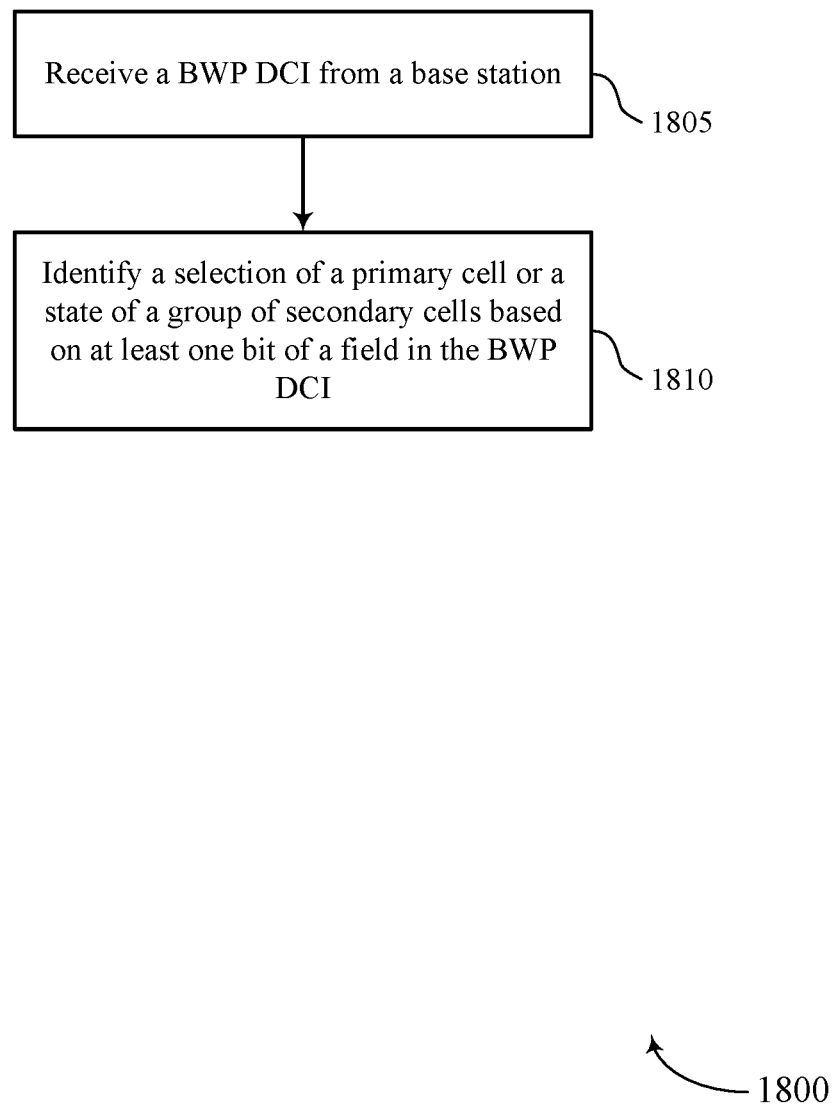

FIG. 18 shows a flowchart illustrating a method 1800 for secondary cell activation and deactivation enhancements in new radio in accordance with aspects of the present disclosure. The operations of method 1800 may be implemented by a UE 115 or its components as described herein. For example, the operations of method 1800 may be performed by a UE cell activation and deactivation manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive a BWP DCI from a base station. The operations of 1805 may be performed according to the methods described herein. In certain examples, aspects of the operations of 1805 may be performed by a bandwidth part component as described with reference to FIGS. 9 through 12.

At 1810 the UE 115 may identify a selection of a primary cell or a state of a group of secondary cells based at least in part on at least one bit of a field in the BWP DCI. The operations of 1810 may be performed according to the methods described herein. In certain examples, aspects of the operations of 1810 may be performed by a state switching component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, UTRA, etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, new radio, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or a new radio system may be described for purposes of example, and LTE or new radio terminology may be used in much of the description, the techniques described herein are applicable beyond LTE or new radio applications.

A macro cell generally covers a relatively large geographic area (e.g., several kilometers in radius). A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
configuring a state of a secondary cell associated with a group of secondary cells to be in a dormant state based at least in part on an active bandwidth part comprising a zero bandwidth part;
configuring in a message a bitmap comprising an indication of the state of the secondary cell; and
transmitting the message including the bitmap comprising the indication of the state of the secondary cell.

2. The method of claim 1, wherein
a physical downlink control channel (PDCCH) on the zero bandwidth part is not monitored when the secondary cell is in the dormant state.

3. The method of claim 1, wherein configuring the state of the secondary cell associated with the group of secondary cells comprises:
configuring the secondary cell associated with the group of secondary cells to switch to a fully activated state from the dormant state based at least in part on a second indication in the message.

4. The method of claim 1, wherein configuring the state of the secondary cell associated with the group of secondary cells comprises:
configuring the secondary cell associated with the group of secondary cells to be in a fully activated state based at least in part on the active bandwidth part comprising a non-zero bandwidth part.

5. The method of claim 1, further comprising:
transmitting, via the secondary cell, a second indication in the message to switch the secondary cell to the zero bandwidth part.

6. The method of claim 5, wherein the second indication comprises a carrier indicator field.

7. The method of claim 1, wherein configuring the state of the secondary cell associated with the group of secondary cells comprises:
configuring the secondary cell associated with the group of secondary cells to switch to a default bandwidth part comprising a zero-bandwidth part based at least in part on a bandwidth timer expiring.

8. The method of claim 1, further comprising:
transmitting, via downlink control signaling, the message including the bitmap comprising the indication of the state of the secondary cell associated with the group of secondary cells,
wherein the message comprises a downlink control information message.

9. The method of claim 1, further comprising:
transmitting, via higher layer signaling, the message including the bitmap comprising the indication of the state of the secondary cell associated with the group of secondary cells,
wherein the higher layer signaling comprises radio resource control signaling or medium access control-control element signaling.

10. The method of claim 1, further comprising:
identifying a set of bits associated with the bitmap in the message, the bitmap comprising the set of bits to indicate states of secondary cells associated with the group of secondary cells,
wherein a presence of the bitmap in the message is determined based at least in part on a zero-resource assignment or a dummy grant for resource allocation.

11. The method of claim 10, further comprising:
receiving a feedback message comprising an indication of a decoding result of the transmitted message, wherein the feedback message comprises an acknowledgement message or a non-acknowledgement message.

12. The method of claim 1, wherein the message comprises a downlink control information message corresponding to a downlink control information format comprising a bandwidth part identifier indicating a target bandwidth part identifier associated with a primary cell and a number of fields for a downlink grant, wherein at least one field of the number of fields comprises the bitmap indicating the state of the secondary cell associated with the group of secondary cells.

13. The method of claim 1, wherein the message comprises bandwidth part activation control information for the secondary cell associated with the group of secondary cells.

14. The method of claim 1, further comprising:
receiving from a user equipment (UE) for the zero bandwidth part when the secondary cell is in the dormant state: a radio resource management (RRM) measurement, a channel state information (CSI) measurement, a sounding reference signal (SRS), a power headroom reporting (PHR) measurement, or communications for a contention-based Random Access Channel (RACH) procedure, or a combination thereof.

15. The method of claim 1, wherein the message comprises a bandwidth part downlink control information message.

16. A method for wireless communications, comprising:
receiving a message including a bitmap comprising an indication of a state of a secondary cell associated with a group of secondary cells;
identifying a configuration of the state of the secondary cell based at least in part on the indication in the received message; and
switching the state of the secondary cell to be in a dormant state based at least in part on the identifying and on an active bandwidth part comprising a zero bandwidth part.

17. The method of claim 16, further comprising:
refraining from monitoring a physical downlink control channel (PDCCH) on the zero bandwidth part when the secondary cell is in the dormant state.

18. The method of claim 16, wherein switching the state of the secondary cell comprise:
switching the state of the secondary cell associated with the group of secondary cells to a fully activated state based at least in part on an active bandwidth part comprising a non-zero bandwidth part,
wherein the fully activated state comprises a non-dormant state.

19. The method of claim 16, further comprising:
receiving, via the secondary cell, a second indication in the message to switch the secondary cell to the zero bandwidth part, the second indication comprising a carrier indicator field, wherein switching the state of the secondary cell comprises:
switching the state of the secondary cell associated with the group of secondary cells to a fully activated state from a partially activated state based at least in part on the second indication.

20. The method of claim 16, wherein receiving the message comprises:
receiving, via downlink control signaling, the message including the bitmap comprising the indication of the state of the secondary cell associated with the group of secondary cells,
wherein the message comprises a downlink control information message.

21. The method of claim 16, wherein receiving the message comprises:
receiving, via higher layer signaling, the message including the bitmap comprising the indication of the state of the secondary cell associated with the group of secondary cells,
wherein the higher layer signaling comprises radio resource control signaling or medium access control-control element signaling.

22. The method of claim 16, further comprising:
determining a presence of the bitmap in the received message based at least in part on a zero-resource assignment or a dummy grant for resource allocation; and
identifying a set of bits associated with the bitmap in the message, the bitmap comprising the set of bits to indicate states of secondary cells associated with the group of secondary cells.

23. The method of claim 16, further comprising:
determining that the state of the secondary cell is in the dormant state; and refraining from monitoring a control channel on the secondary cell based at least in part on the state of the secondary cell being in the dormant state, wherein the control channel comprises a physical downlink control channel.

24. The method of claim 16, further comprising:
transmitting a feedback message comprising an indication of a decoding result of the received message, wherein the feedback message comprises an acknowledgement message or a non-acknowledgement message.

25. The method of claim 16, wherein the message comprises a downlink control information message corresponding to a downlink control information format comprising a bandwidth part identifier indicating a target bandwidth part identifier associated with a primary cell and a number of fields for a downlink grant, wherein at least one field of the number of fields comprises the bitmap indicating the state of the secondary cell associated with the group of secondary cells.

26. The method of claim 16, wherein the message comprises bandwidth part activation control information for the secondary cell associated with the group of secondary cells.

27. The method of claim 16, further comprising:
performing, for the zero bandwidth part when the secondary cell is in the dormant state, one or more of: a radio resource management (RRM) measurement, a channel state information (CSI) measurement, a sounding reference signal (SRS) transmission, a power headroom reporting (PHR) measurement, and communications for a contention-based Random Access Channel (RACH) procedure.

28. The method of claim 16, wherein the message comprises a bandwidth part downlink control information message.

29. An apparatus for wireless communications, comprising:
a processor,
memory coupled with the processor; and
instructions stored in the memory and executable by the processor to cause the apparatus to:
configure a state of a secondary cell associated with a group of secondary cells to be in a dormant state based at least in part on an active bandwidth part comprising a zero bandwidth part;
configure in a message a bitmap comprising an indication of the state of the secondary cell; and
transmit the message including the bitmap comprising the indication of the state of the secondary cell.

30. An apparatus for wireless communications, comprising:
a processor,
memory coupled with the processor; and
instructions stored in the memory and executable by the processor to cause the apparatus to:
receive a message including a bitmap comprising an indication of a state of a secondary cell associated with a group of secondary cells;
identify a configuration of the state of the secondary cell based at least in part on the indication in the received message; and
switch the state of the secondary cell to be in a dormant state based at least in part on the identifying and on an active bandwidth part comprising a zero bandwidth part.

* * * * *